United States Patent [19]
Fitzgerald

[11] 3,968,732
[45] July 13, 1976

[54] HYDRAULIC POWER TRANSMISSION SYSTEM

[76] Inventor: William Maurice Bard Fitzgerald, R.R. No. 1, Claremont, Ontario, Canada

[22] Filed: Sept. 9, 1974

[21] Appl. No.: 504,725

Related U.S. Application Data

[62] Division of Ser. No. 305,453, Nov. 10, 1972, Pat. No. 3,841,797.

[52] U.S. Cl. .................. 91/414; 60/426; 60/427; 91/412; 91/461
[51] Int. Cl.² ................................ F15B 11/16
[58] Field of Search .............. 91/411 R, 412, 414, 91/461, 304, 413; 137/118; 60/420, 426, 427; 180/44 F, 66 R, 44 M

[56] References Cited
UNITED STATES PATENTS

| | | | |
|---|---|---|---|
| 2,467,576 | 4/1949 | Zimmerman | 60/426 |
| 2,616,259 | 11/1952 | Quintilian | 91/411 X |
| 3,129,781 | 4/1964 | Stein | 60/426 X |
| 3,154,925 | 11/1964 | DeVita | 91/412 X |
| 3,381,586 | 5/1968 | Rosenberg | 91/461 X |
| 3,448,577 | 6/1969 | Crawford | 91/413 X |
| 3,481,419 | 12/1969 | Kress et al. | 180/44 M |
| 3,509,721 | 5/1970 | Crawford | 91/413 X |
| 3,802,320 | 4/1974 | Stafford | 91/413 X |
| 3,851,566 | 12/1974 | Herrmann | 91/414 X |

*Primary Examiner*—Carlton R. Croyle
*Assistant Examiner*—Edward Look

[57] ABSTRACT

In a system comprising first and second drive units each including one or more hydraulic motors, a two-position valve is provided in circuit with the motors of one drive unit, the motors of the other drive unit being supplied independently of the valve; the valve has a first operative position for blocking flow of working fluid to the one drive unit and a second operative position for permitting flow of working fluid to the one drive unit, the valve being operable between its first and second positions for selective operation of one or both drive units.

8 Claims, 45 Drawing Figures

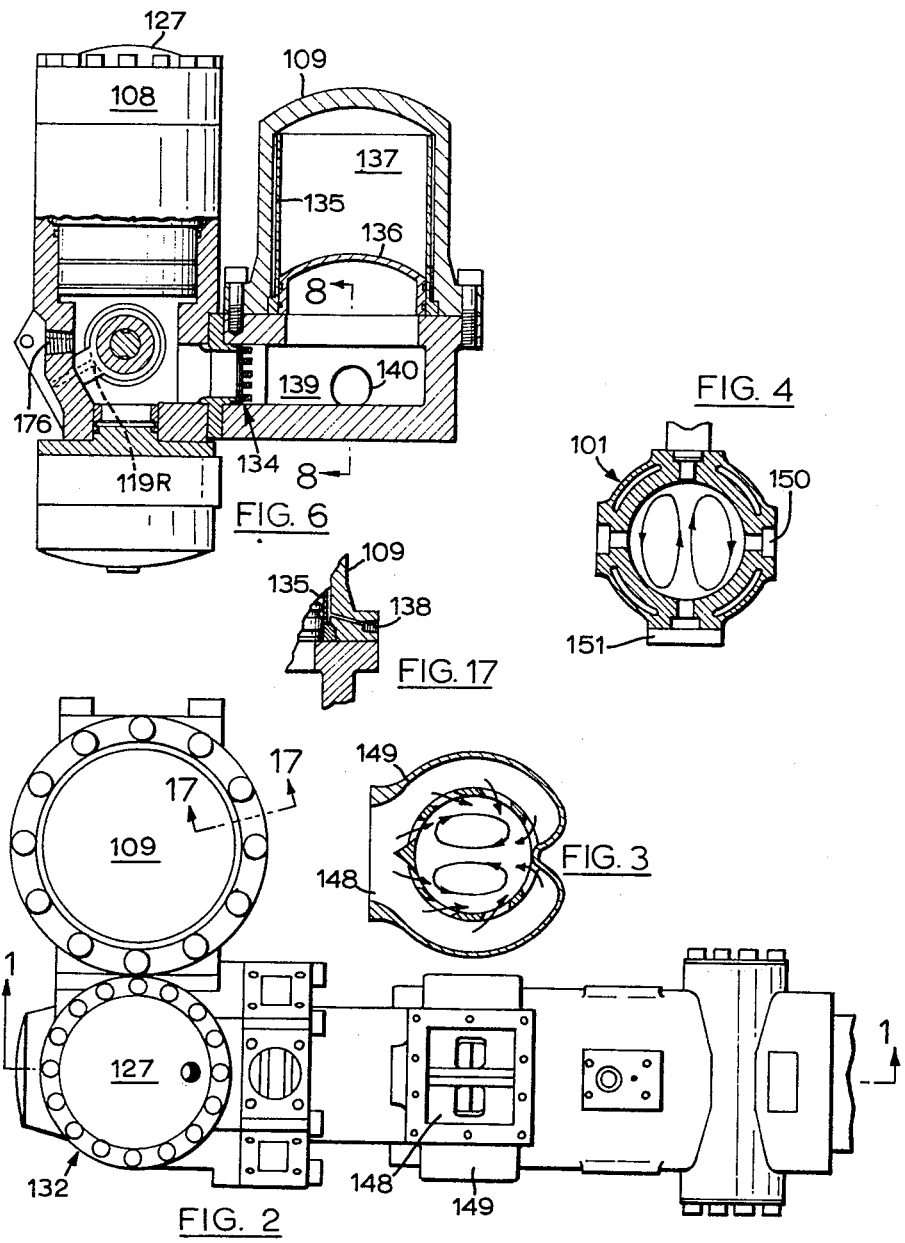

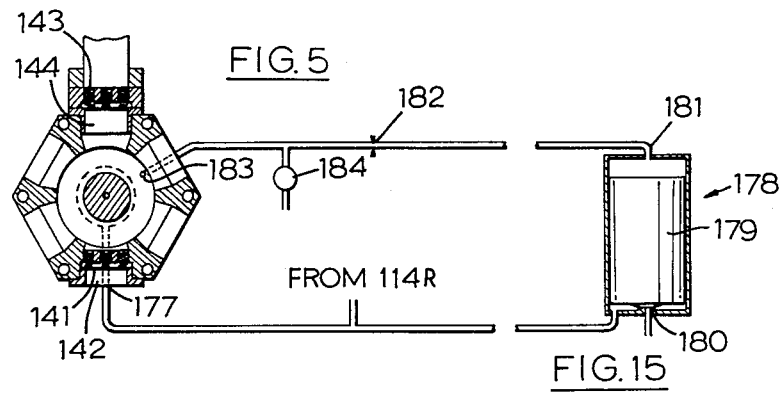
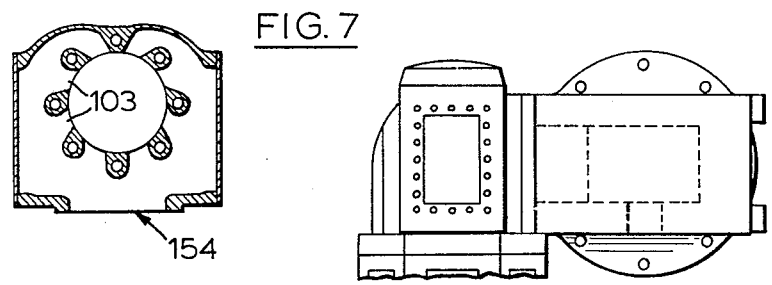
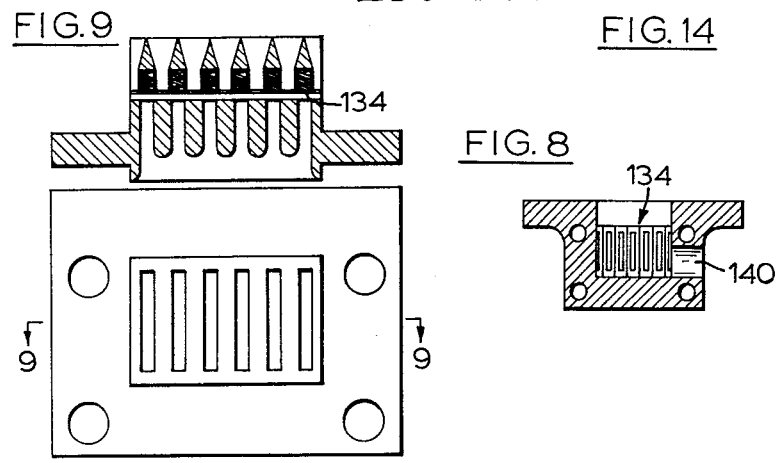

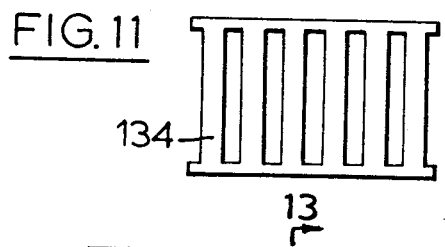
FIG. 11
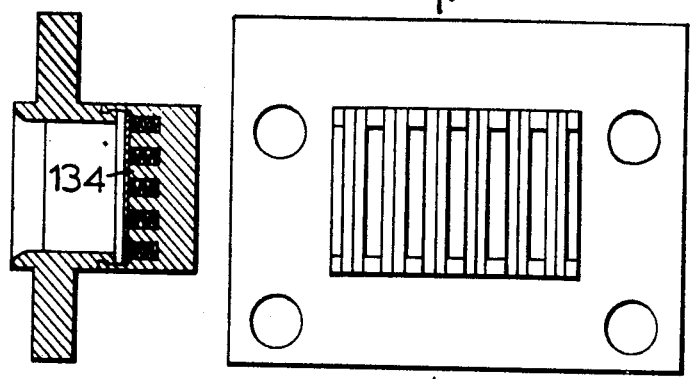
FIG. 13
FIG. 12
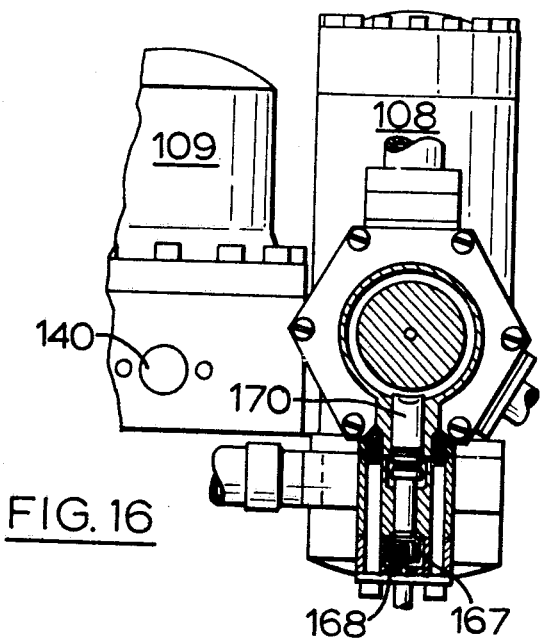
FIG. 16

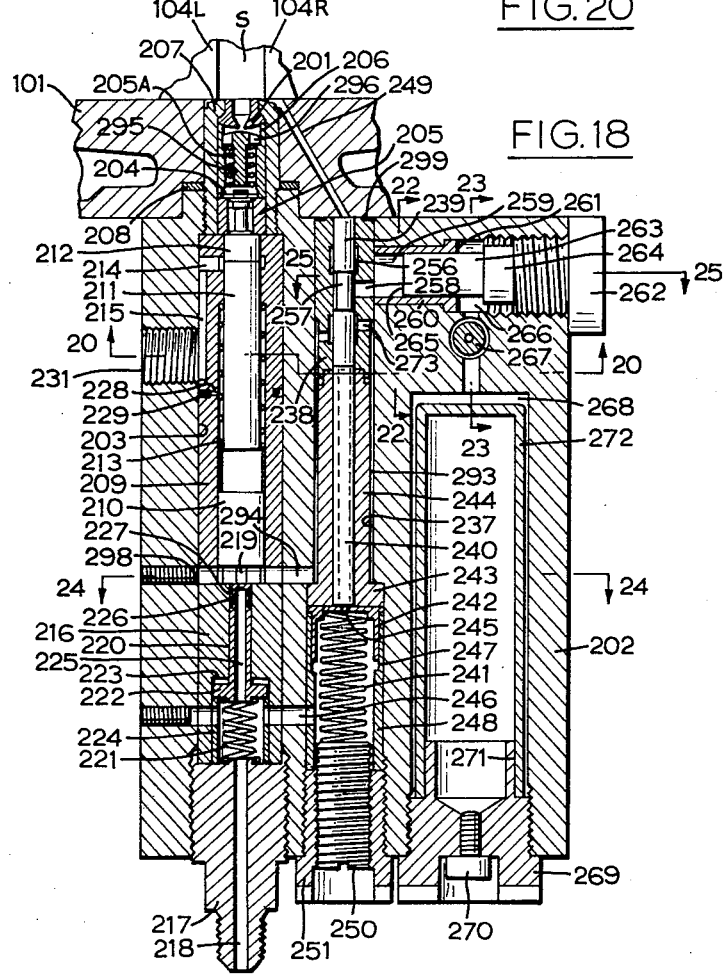

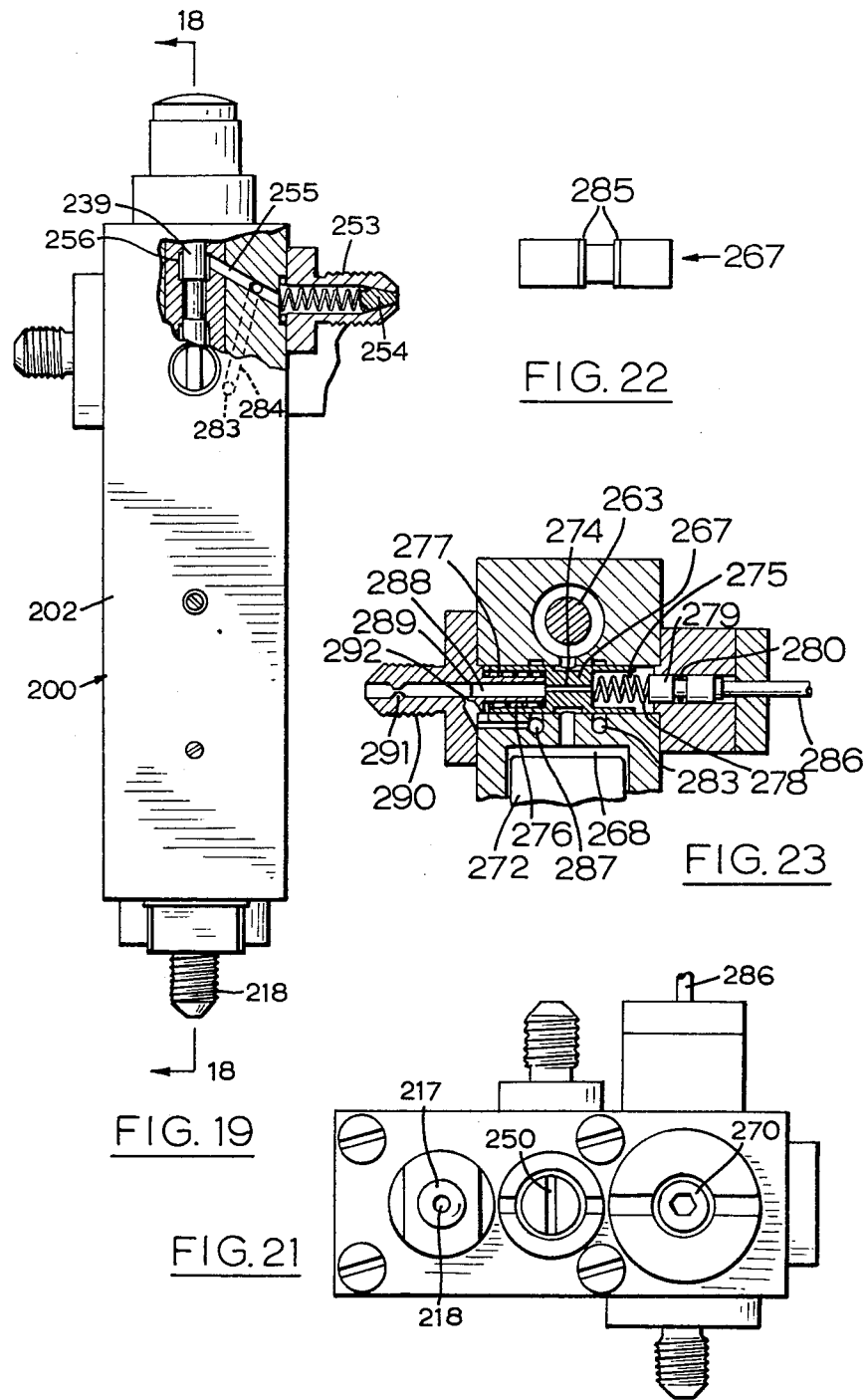

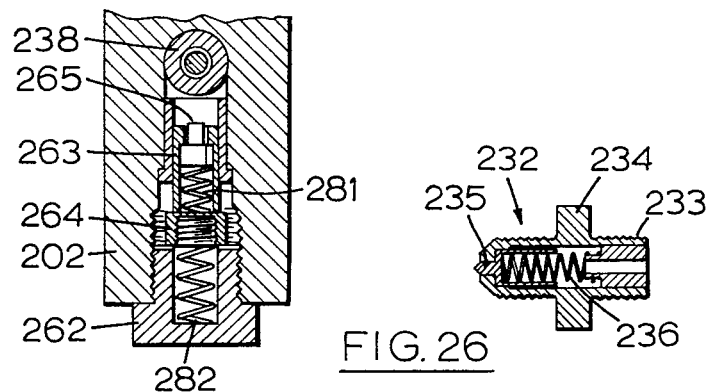
FIG. 25
FIG. 26
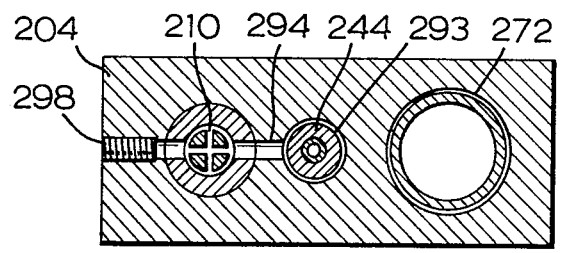
FIG. 24
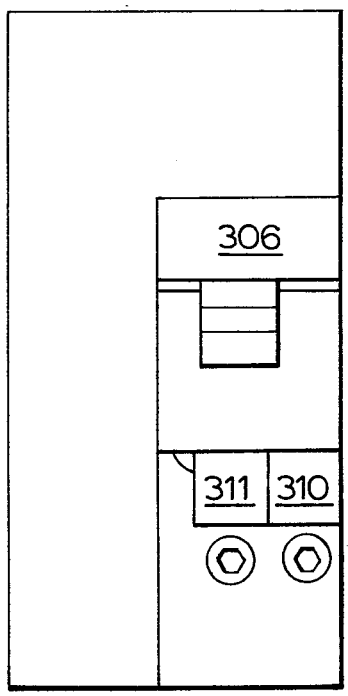
FIG. 30
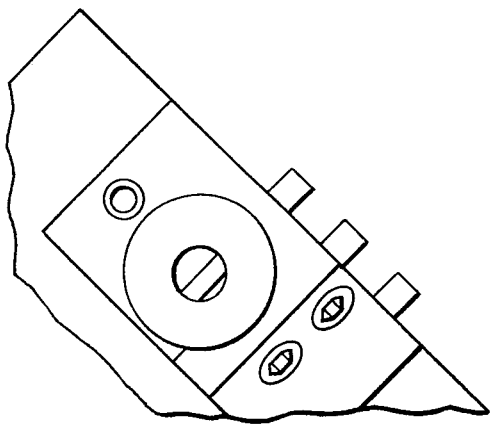
FIG. 32

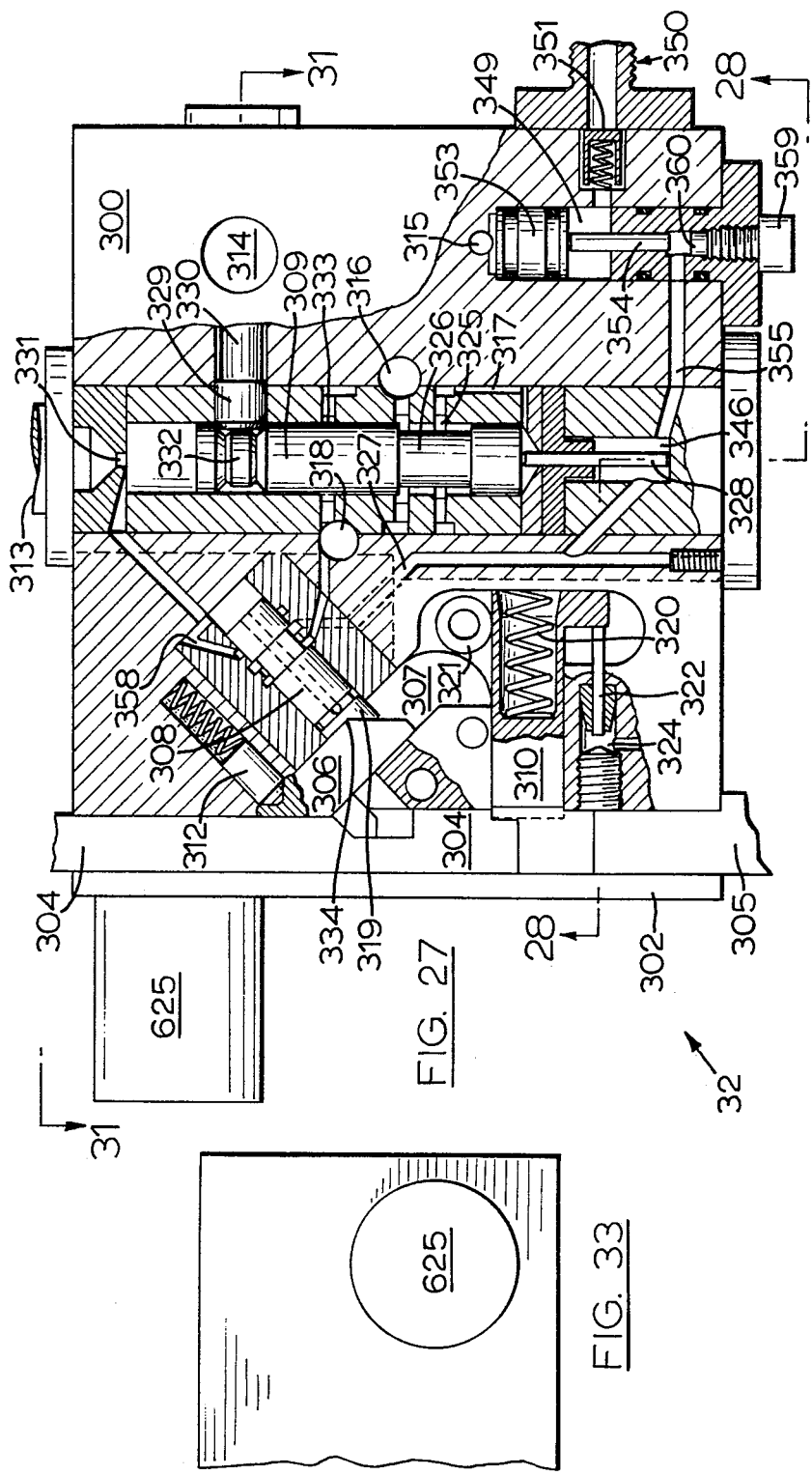

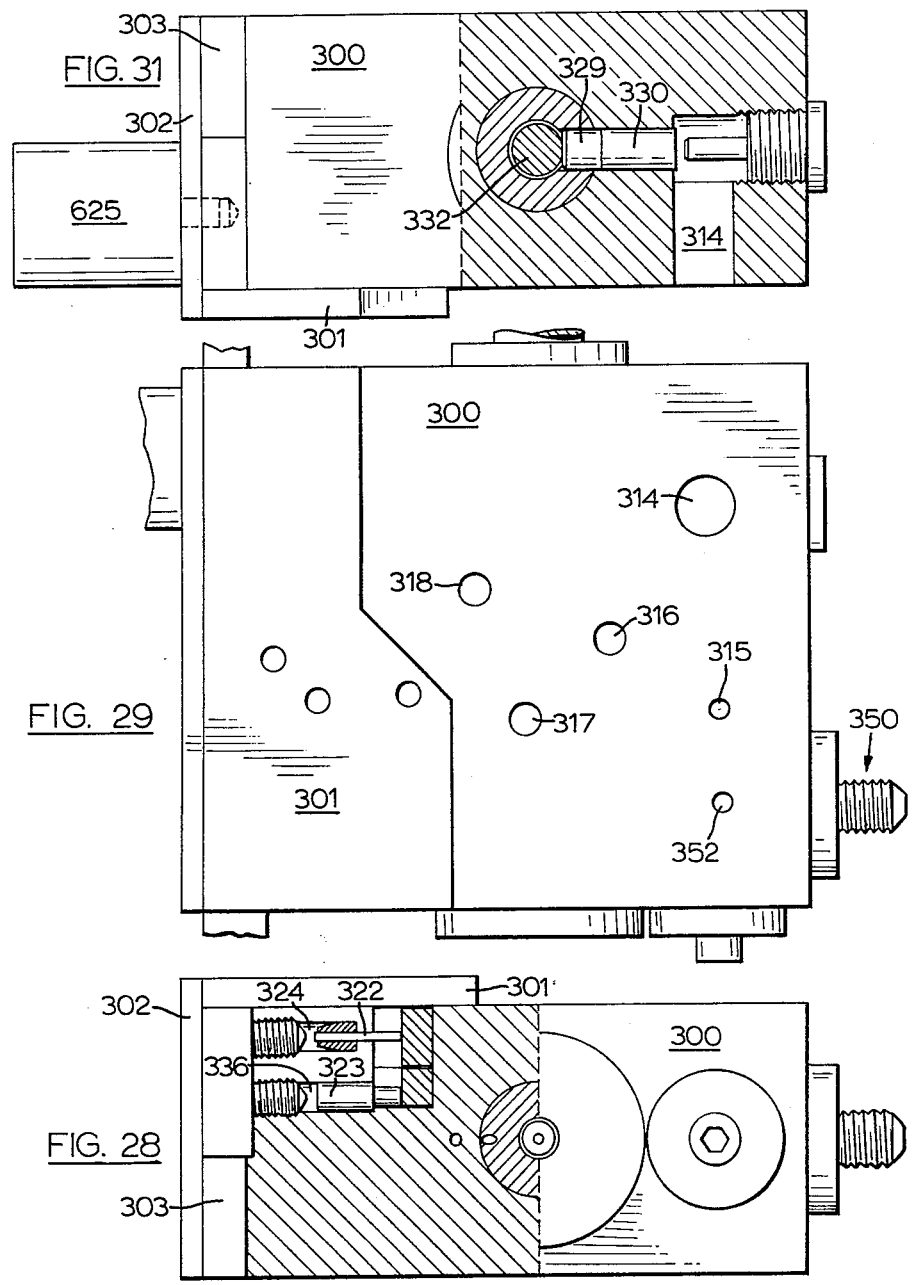

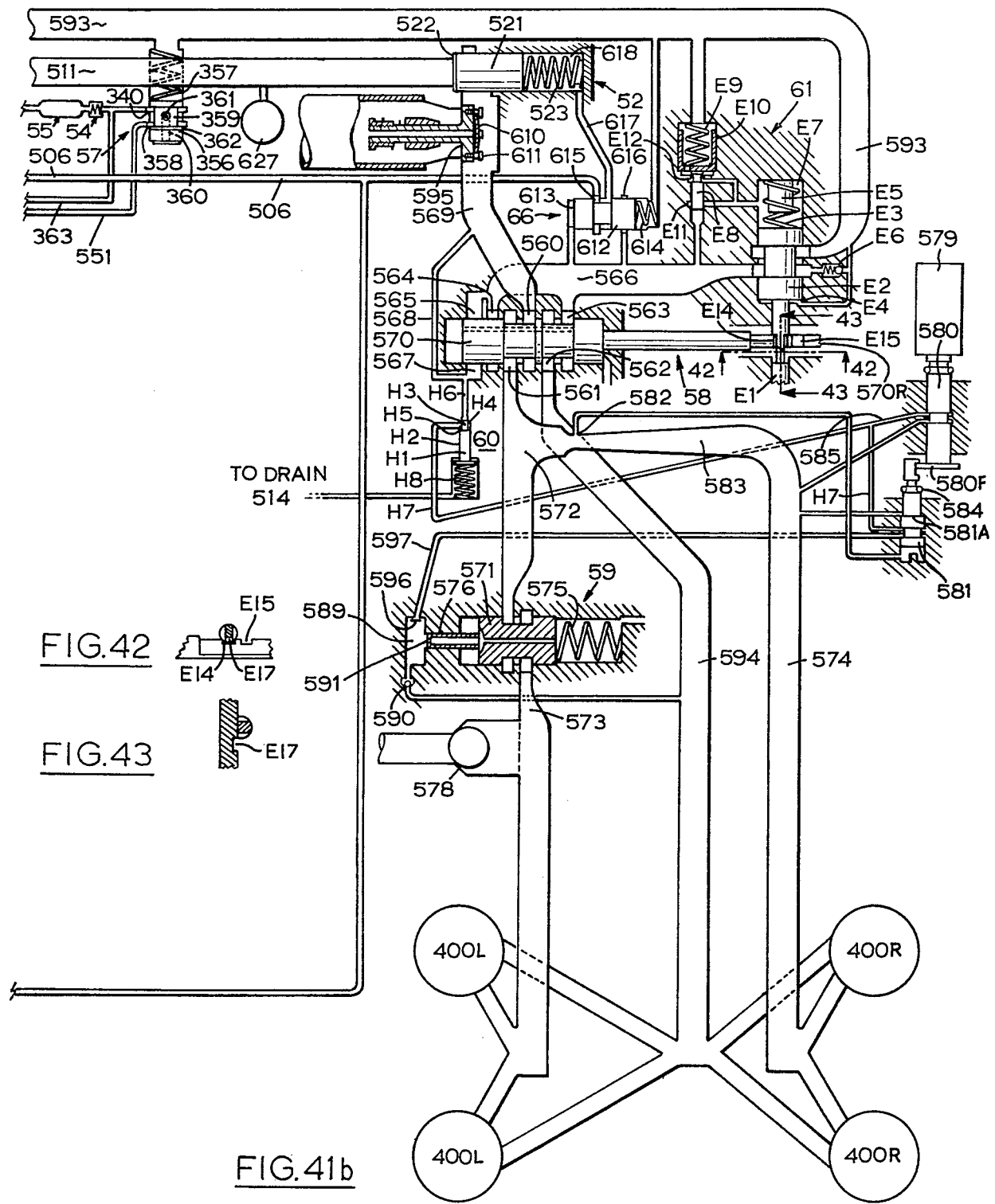

HYDRAULIC POWER TRANSMISSION SYSTEM

CROSS REFERENCE TO RELATED APPLICATION

The present application is a divisional of my copending application Ser. No. 305,453, filed Nov. 10, 1972, now U.S. Pat. No. 3,841,797, relating to "Power Units".

BACKGROUND OF THE INVENTION

This invention relates to a hydraulic power transmission system comprising first and second drive units each including one or more hydraulic motors.

Hitherto, in such a system, no means has been provided to alter the torque automatically and manually by cutting in and out the motors selectively. In order to alter the torque it has invariably been necessary to provide gears, clutches, brakes, etc., except in cases where a fluid flywheel was provided. A fluid flywheel has the disadvantage of being inefficient at low speeds.

It is the object of the present invention to provide a hydraulic power transmission system which overcomes the disadvantages mentioned, and which provides a particularly advantageous method of altering the torque of a motor system comprising a plurality of motors driven from a common hydraulic source.

SUMMARY OF THE INVENTION

According to the invention, in a system comprising first and second drive units each including one or more hydraulic motors, a two-position valve is provided in circuit with the motors of one drive unit, the motors of the other drive unit being supplied independently of the valve; the valve has a first operative position for blocking flow of working fluid to the one drive unit and a second operative position for permitting flow of working fluid to the one drive unit, the valve being operable between its first and second positions for selective operation of one or both drive units.

One embodiment of the invention, as applied to a power unit and transmission system for a wheeled vehicle, will now be described by way of example with reference to the accompanying drawings, in which:

FIG. 2 is a fragmentary top plan view of the power unit;

FIG. 3 is a section on line 3—3 in FIG. 1;

FIG. 4 is a section on line 4—4 in FIG. 1;

FIG. 5 is a section on line 5—5 in FIG. 1;

FIG. 6 is a section on line 6—6 in FIG. 1;

FIG. 7 is a section on line 7—7 in FIG. 1;

FIG. 8 is a section on line 8—8 in FIG. 6;

FIGS. 9, 10, 11, 12 and 13 show details of a plate valve assembly shown in FIGS. 1, 6 and 8;

FIG. 14 is an underneath plan view of the detail shown in section in FIG. 6, without the inlet valve assembly;

FIG. 15 is a diagrammatic drawing showing leakage control of oil from the pump pistons of the power unit;

FIG. 16 shows a section on line 16—16 in FIG. 1;

FIG. 17 shows a section on line 17—17 in FIG. 2;

FIG. 18 shows a central vertical section through the fuel injector of the unit, the section being on line 18—18 of FIG. 19;

FIG. 19 is a partly sectioned side elevation of the fuel injector;

FIG. 20 is a section on line 20—20 in FIG. 18;

FIG. 21 is an unsectioned end view of FIG. 18;

FIG. 22 shows the outside of a spool valve element;

FIG. 23 is a section on line 23—23 in FIG. 18;

FIG. 24 is a section on line 24—24 in FIG. 18;

FIG. 25 is a section on line 25—25 in FIG. 18;

FIG. 26 is a sectional view of a valve connector adapted to be used with the fuel injector;

FIG. 27 is a part-sectional plan view of a control gear for starting and stopping the power unit;

FIG. 28 is a part elevation on line 28—28 in FIG. 27;

FIG. 29 is an unbroken plan view of the control gear;

FIG. 30 is an end elevation of the control gear viewed from the left in FIG. 27 with certain parts removed;

FIG. 31 is a sectional plan view on line 31—31 in FIG. 27;

FIG. 32 is a fragmentary view in the direction of arrow 32 in FIG. 27 with certain parts removed;

FIG. 33 is a part elevation showing the end view of a solenoid;

Figure 41A:
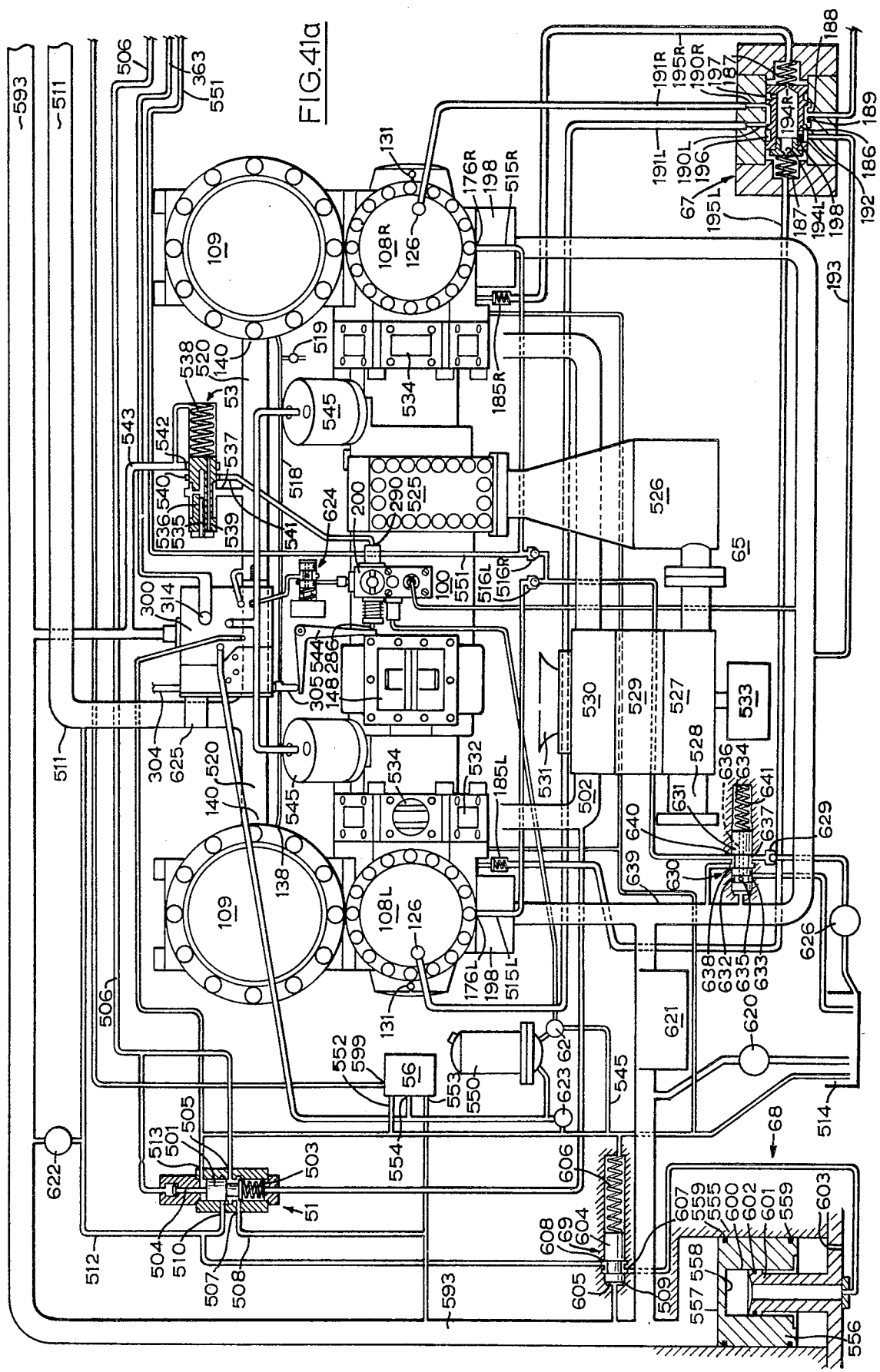

FIG. 41, a combination of FIG. 41a and FIG. 41b, is a schematic overall representation of the complete power unit and ancillary equipment;

FIG. 42 is a section on line 42—42 in FIG. 41;

FIG. 43 is a section on line 43—43 in FIG. 41.

THE POWER UNIT

General

The power unit comprises an internal combustion engine having a pair of opposed free pistons, a pair of pump units the pistons of which coact with the engine pistons, a pair of constant displacement hydraulic accumulators into which pressurized hydraulic fluid is pumped in accordance with the expansion strokes of the engine pistons, inlet ports and exhaust ports under the control of the pistons for admitting combustion air to, and exhausting combustion gases from, the engine, and valve operated fuel injection means actuated in accordance with the cyclical movements of the pistons to control the injection of fuel into the engine. The power output from the engine is a flow of pressurized hydraulic fluid, which in the present example is delivered from a pair of smoothing accumulators and used to drive hydraulic motors.

Arrangement and Mechanical Construction

Figure 1:
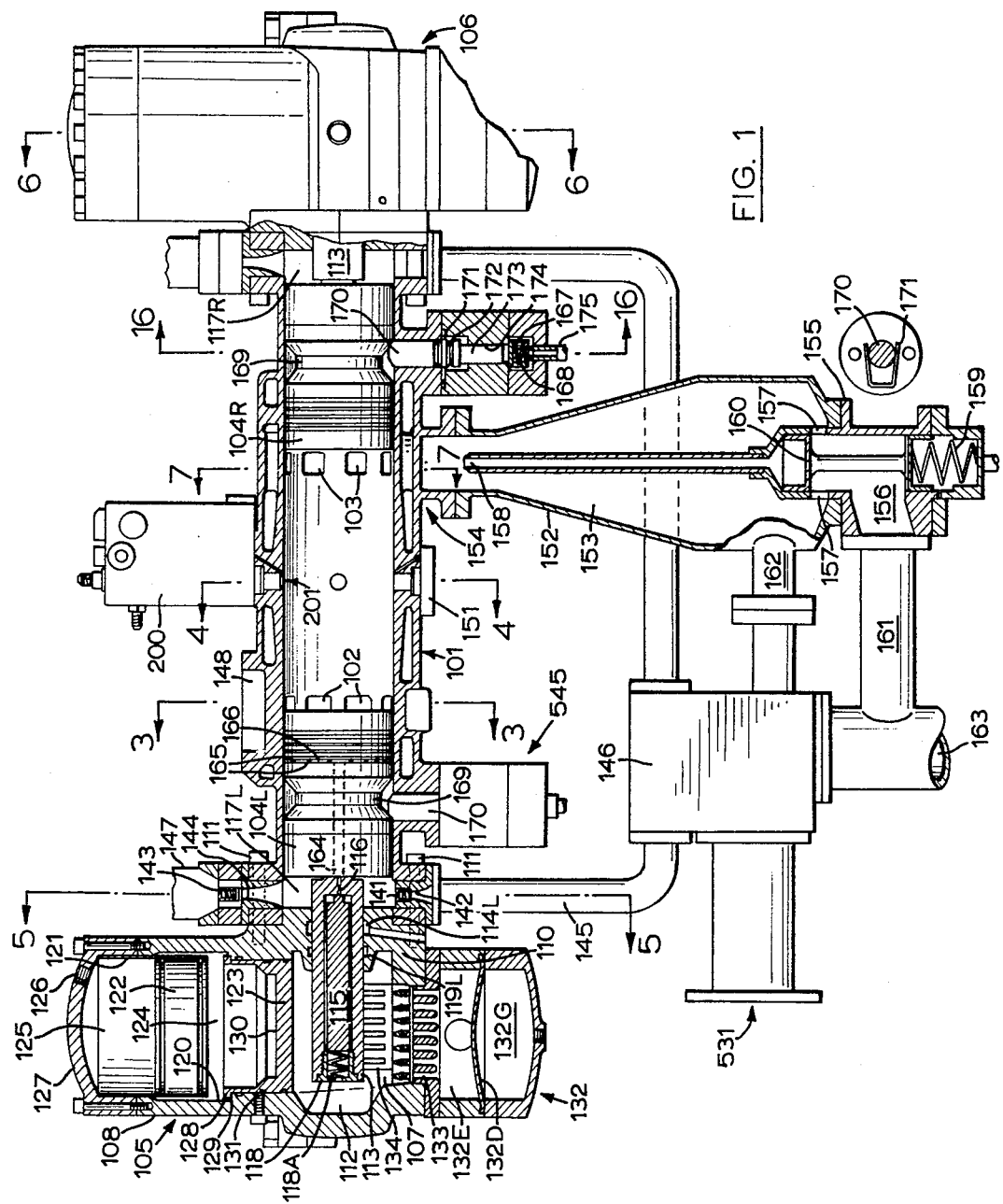
FIG. 1 is a longitudinal section taken through the axis of the power unit.

The mechanical construction of the power unit itself, and certain details of such construction, are illustrated in FIGS. 1 to 17, of which FIG. 1 best illustrates the general arrangement of the unit. Reference will now be made to these figures in particular.

At the heart of the power unit is a compression-ignition engine comprising a single, water-cooled cylinder 101 having a ring of air inlet ports 102 and a ring of exhaust ports 103, and a pair of opposed free pistons 104L and 104R of equal mass. The pistons 104L and 104R are free to reciprocate within the cylinder 101, and the overall design includes means to ensure that the pistons always move simultaneously in opposite directions and are also disposed symmetrically on opposite sides of a central position denoted by line 4—4 in FIG. 1. A fuel injector 200 is bolted to the cylinder 101 at the central position, so that its nozzle 201 is positioned to inject fuel into the space between the opposed pistons at appropriate times, as will be described hereinafter.

Each end of the cylinder 101 is bolted to a respective one of two similar hydraulic accumulator-pump assemblies 105, 106. The assembly 105 (which will be described in detail, the assembly 106 being identical in construction) comprises a pump unit 107, a first, constant displacement hydraulic accumulator 108, and a second, high pressure or smoothing hydraulic accumulator 109, the assembly having a casing structure including a bulkhead 110 which is bolted to the cylinder and by bolts 111.

The pump unit 107 provides an internal oil-filled space or pump chamber 112, and houses a composite cylindrical or pump piston 113 which is a reasonably leak-free sliding fit in the bulkhead 110. The combined effects of the momentum of the pump piston 113, and the pressure in the pump chamber 112, ensure that the pump piston 113 is always pressed against the engine piston 104L.

A groove 114 in the bulkhead allows oil leaking along the outer wall of the pump piston 113 to pass into a pipe 177 (FIG. 5) which conveys it to a float chamber 178. Within the float chamber 178 is a float 179, which on rising uncovers a drain hole 180 leading back to a vented reservoir 514, (FIG. 4) via a pipe X. A tube, 181 leading via a restrictor 182 to a hole 183 in the bulkhead 110 gives access to the air compression space 117. A valve 184 may be used to open or close access to the air compression space so that air may be extracted therefrom in order to form a vaccum with which to suck the pistons 104L and 104R into their starting position. The float 179 and drain hole 180 are preferably so dimensioned that the float will rise before its total submersion under any conditions of average pressure that may exist in float chamber 178. In any case after the engine is brought to rest, pressure in the float chamber 178 will fall so that oil leaking along the outer wall of the pump piston 113 will flow into it, and when the level is sufficiently high the float will rise and allow the leaking oil to flow down into a vented reservoir 514 (FIG. 41).

The pump piston 113 is in the form of a hollow ram which defines an internal oil space and contains a heavy plunger 115 which is free to move back to a retaining screw 118, and forward to cover an oil flow restrictor 116 at the inner end of the ram; it will move in this manner under the impetus of its own inertia, pressing against the oil flow restrictor 116 at the inner end when the piston 104L is accelerating during the first part of its outward stroke and decelerating during the last part of its re-compression stroke. The ram will be pressed against the retaining screw 118 during the last part of its expansion stroke and the first part of its recompression stroke. The restrictor 116 allows a controlled quantity of oil to pass into a hole shown by dotted lines 164 and on through a number of holes 165 into a groove 166 round the piston 104L for cylinder wall lubrication where the piston slides. A spring 118A contained within the retaining screw 118 urges the solid rod 115 inwards to close the restrictor 116 when the engine is at rest so that oil cannot escape through the restrictor at this time.

The first, constant displacement accumulator 108 comprises a domed casing providing a stepped cylindrical internal surface 120. The domed casing houses a downwardly projecting cylindrical sleeve 121 in which a piston 122 is free to move axially up or down. The lower portion of said stepped cylindrical surface constitutes a cylinder communicating with the pump chamber 112 and locating a leak-free piston 123 which is free to move axially up or down. The pistons 122 and 123 define within the first accumulator a space 124 of variable volume which contains nitrogen or other gas under pressure. A second, oil-filled space 125 is situated above piston 122, to or from which oil may be admitted or withdrawn via a port 126 in the dome 127 of the casing. The piston 123 is formed with a flange 128 which is adapted to come to rest against a step 129 of said stepped cylindrical surface 120 and to abut against the lower end of the sleeve 121, for limiting the downward and upward movements of the piston 123. Thus the piston 123 is constrained to move between lower and upper limit positions which determine the minimum and maximum charge levels of the accumulator, respectively. A sump 130 is formed by the piston 123, in which any oil that may leak into the space 124 will collect and from which it may be withdrawn via a duct 131. This duct also serves for recharging the gas space 124 and to adjust its pressure; a suitable valve would normally be fitted into the duct 131.

It is necessary to ensure rapid establishment of inlet oil flow into the pump chamber 112 once the chamber pressure falls as the result of the flange 128 of accumulator piston 123 coming to rest against the step 129, while the pump piston 113 still continues its outward stroke. For this purpose, an inlet oil assembly 132 is provided to control the flow of oil through a spring-loaded plate valve 133. In this assembly: (1) the mass of the moving element of the valve 133 is kept reasonably low; (2) a diaphragm 132D, backed by a suitable gas such as nitrogen, contained in a space 132G, keeps to a minimum the mass of oil that must be accelerated on each cycle; (3) the cross-sectional area of the oil, perpendicular to its direction of flow, is large so as to keep the oil velocity low; (4) the inlet oil in space 132E is raised to a fairly high pressure, which for example might in a particular instance be 150 pounds per square inch. When the pump piston 113 moves inwards into the pump chamber 112, the first accumulator is first charged to its full capacity and then oil is forced via a second automatic spring-loaded plate valve 134 into the second hydraulic accumulator 109. The details of construction of the second automatic plate valve 134, which is essentially a high speed one-way valve, are illustrated in FIGS. 9 to 13. The first automatic plate valve may be similarly constructed. As illustrated in FIGS. 9 to 13, the valve comprises essentially a stationary valve element in the form of a grid, and a thin plate which is formed as a complementary grid, the thin plate being urged into contact with the stationary valve element by an array of contact with the stationary valve element by an array of compression springs. When the valve is closed, the grid elements of the thin plate close off the spaces between the elements of the stationary valve element; when the thin plate is displaced by a small amount, however, these spaces are opened simultaneously. Thus the valve opens substantially to its maximum extent with a minimal displacement of the movable element.

The second hydraulic accumulator 109, best shown in FIG. 6, is connected to the oil delivery opening of the pump chamber 112, which opening is controlled by the automatic one-way valve 134. The accumulator 109 comprises a domed casing housing a cylindrical sleeve 135 within which a piston 136 is free to slide axially up or down. The piston 136 defines within the sleeve 135 a space 137, which is filled with nitrogen or other suitable gas under pressure. A vent 138 (FIG. 17) for filling the space 137 leads into the clearance space that exists between the cylindrical sleeve 135 and the casing 109. When the pump piston 113 moves inwards it first charges the constant displacement recompression accumulator 108 by forcing the piston 123 up until the latter is brought to rest against the lower end of the sleeve 121, and oil then passes from the chamber 112 via the one-way valve 134 into an oil space 139 of the second accumulator 109, which has an outlet port 140 from which the pressurized oil is supplied to the hydraulic load circuit.

Communicating with the air compression space 117 behind each of the engine pistons 104L and 104R is a thin spring-loaded air inlet valve 141 fitted in an entrance 142, and a thin spring-loaded air delivery valve 143 fitted in an outlet 144; these valves admit air into the compression spaces 117 on the compression strokes of the pistons, and permit egress of air from the compression spaces on the expansion strokes of the pistons, respectively. The entrance 142 may be connected by flexible metal tubing to an air inlet filter, atmospheric air being filtered and admitted through the valves. In the preferred embodiment illustrated in the drawings, however, the entrances 142 are connected by a duct 145 to the outlet of an air compressor 146. The duct 145 may also include an air cooler. The compressed air from the outlets 144, after cooling if necessary, is conveyed via ducts 147 (shown broken away in FIG. 1) to an inlet 148 communicating via an air inlet manifold 149 with the inlet ports 102 of the engine cylinder (see FIG. 3). The inlet ports 102 and the ends of the air inlet manifold 149 are preferably shaped so as to induce a swirling motion of the incoming air, for example as indicated by the arrows of FIG. 3. In the present embodiment the depth of the channel perpendicular to the cross sectional plane of FIG. 3, tapers from the inlet 148 to the ends of the manifold so as to promote approximately the same air velocity throughout the manifold. This produces two elongated air flow vortices in the engine cylinder, as indicated in FIG. 3, Fuel is injected from the injection nozzle 201, as indicated in FIG. 4, at about maximum compression.

Additional openings 150 may be provided in the wall of the engine cylinder 101. These openings, one of which is presently shown closed by a cover 151, may be used to apply compressed air for moving the pistons apart if necessary, (when the engine is inoperative,) or to connect a pressure gauge for research or experimental purposes, or to provide an alternative means for fuel injection to fuel injection timing, or to admit air when the pistons are being set in a starting position, as will be explained hereinafter.

The engine exhaust system comprises a casing 152 providing a storage space 153, which communicates with the exhaust ports 103 via a manifold or passage 154 in the engine cylinder. A casing 155 bolted to the bottom end of the casing 152 provides an internal space 156 which communicates with the storage space 153 by way of ports 157. An intake tube 158 connected to the upper end of the casing 155 projects upwards in alignment with the passage 154, the latter being spaced from the end of the intake tube. The casing 155 also provides an internal cylinder portion containing a spool valve 160, which is biased upwardly by a spring shown diagrammatically at 159. In operation of the engine, when the exhaust ports 103 are uncovered by the piston 104R towards the end of a compression stroke, the products of combustion enter the storage space 153 and impinge upon the intake tube 158. If the kinetic energy of the exhaust gases is relatively low, the spool valve 160 remains at its upper position and the exhaust gases pass to a silencer (not shown) via ducting 161. However, if the kinetic energy of the exhaust gases is sufficiently high, the spool valve 160 is disposed downwards to cover the ports 157; in this case the gases in the storage space 153, being of increased pressure, pass through a duct 162 to an exhaust turbine, the latter being combined with the air compressor 146. The spent gases are finally exhausted via a pipe 163 and a silencer (not shown).

Each of the engine pistons is formed with a circumferential annular groove 169 having bevelled sides, into which a plunger 170 having a correspondingly bevelled end may be forced. In order to lock the pistons against movement when the engine is not running. In FIG. 1 the plungers 170 are shown neither fully in nor fully out, but are shown for illustration in an intermediate position. Each plunger 170 is normally held out of the respective annular groove 169 when the engine is running, by a U spring 171 which engages a grooved portion 172 of the plunger. When required, the plungers 170 are pressed into their operative, piston-holding positions by actuating pistons 173; the latter are slidable in cylinders 174 and are actuated by hydraulic pressure applied via oil connections 175 when the pistons 104L and 104R are near the ends of their expansion strokes. The plungers 170 hold the pistons 104L and 104R approximately in the position shown in FIG. 1, against the forces exerted by the rams 113, the latter being urged by hydraulic pressure from the accumulators 108. The forward speed of each actuating piston 173 is controlled by an orifice in a plate valve 167; the parts are designed to permit comparatively free flow in the reverse direction when the engine is being started. A light spring 168 holds the valve plate normally forward.

The output of the engine is a flow of pressurized liquid. The amplitude and frequency at which the engine pistons 104L and 104R reciprocate are variable, depending upon the power that is being developed. The positions at which the pistons momentarily stop at the end of the compression stroke are largely determined by the initial momentum of the pistons and the pressure of the initial cylinder air charge. The positions at which the pistons momentarily stop at the end of the expansion stroke are determined by the momentum that they have gained from the energy of combustion, the cyclic range of oil pressures, and the rate of flow of the hydraulic liquid. To maintain an approximately constant compression ratio in the engine cylinder 101, more energy will be required at high intake air pressures than at low intake air pressures; however, the same invariable volume of oil, determined by the stroke of each piston 123 of the constant displacement hydraulic accumulators, as it reciprocates between the limits of its movement, will always be set aside for the return strokes of the engine pistons. Therefore the average pressure of this oil must be altered as required in accordance with the pressure of the intake air. It can easily be shown that when the average oil pressure in each of the constant displacement accumulators 108 is low, (to accommodate low intake air pressure,) the average compression speeds of the pistons 104L and 104R will also be low and the time taken to effect the compression strokes will be correspondingly long. Conversely, when the average oil pressure in each of the constant displacement accumulators 108 is high, the speeds of the pistons 104L and 104R will be high, so that the time to effect the compression strokes will be correspondingly short. The same factors apply to the speeds of the pistons on the expansion strokes, so that the time to complete the strokes will be an inverse function of the energy developed. The net result is that the rate of reciprocation of the engine pistons will be low at low power outputs and high at high power outputs.

POWER UNIT OPERATION

With the "stop" plungers 170 completely retracted, the engine pistons 104L and 104R and the pump pistons 113 are initially in the positions shown in FIG. 1 with the engine pistons moving towards one another; the engine pistons 104L and 104R and the pump pistons 113 together have sufficient momentum to give an air compression ratio of, say 20:1, or higher. Subsequently to this initial stage the oil inlet plate valves 133 open. The air inlet valves 141 are already open and the air delivery valves 143 are closed, so that air enters the air compression spaces in the engine cylinder lying between the engine pistons and the bulkheads 110. The pump pistons 113 also move out from the pump chambers 112, under the action of their momentum and the pressurized fluid passing through the inlet oil valves 133. At about the position when the momentum of the pump pistons, together with the momentum of the engine pistons 104L and 104R, is spent in compressing the air charge in the cylinder 101, fuel is injected into the cylinder by the fuel injector 200; the gas charge temperature and the relative pressure then rises and the engine pistons are caused to accelerate away from each other, performing their working or expansion stroke.

The one-way plate valves 133 then close and the pump pistons 113 are forced inwards by pistons 104, first to charge the accumulators 108, which are adjusted so as to yield at less pressure than the pistons 136 of the variable displacement accumulators 109. When the pistons 123 have completed their strokes, which are terminated by the abutment of these pistons against the lower ends of the sleeves 121, the pressure in the pump chambers 112 continues to rise and the one-way plate valves 134 open against the pressure in the oil spaces 139 of the variable displacement accumulators 109. During normal running of the unit, the pistons 136 are at a higher position than that shown in the drawings, depending upon the pressure required. The surge of oil on each pumping stroke, after first displacing the pistons 123 in the constant displacement accumulators 108, is absorbed in urging the pistons 136 inwards against the pressure of gas in the gas spaces 137, but the oil is continually leaving at a more moderate velocity through the outlet ports 140. When the momentum of the engine pistons 104L and 104R is spent, the pistons stop and the high speed plate valves 134 close. The pistons 123 are subjected to pressure from the gas above them and still maintain a substantial pressure on the oil in the pump chambers 112; this pump chamber pressure acts on the pump pistons 113 and accelerates the engine pistons 104L and 104R back along another compression stroke as already described. During the time in which the pistons 104L and 104R are moving outwards on the expansion stroke, the pressure in the air compression spaces 117 is increasing, and when this pressure exceeds the pressure above the air delivery valves 143, the latter open to admit this air charge.

Outlets 176 from the pump chambers 112 are connected to pipes 515L, 515R (FIG. 41), as will be described hereinafter. A peripheral groove 119 is incorporated in the piston-rod bearing of each bulkhead as part of a means to ensure synchronization of the engine pistons 104L and 104R, as will also be explained hereinafter. By these means continuous running of the engine is achieved.

THE FUEL INJECTOR

General

The fuel injector 200 of FIG. 1 comprises injection means for injecting predetermined quantities of fuel into the engine cylinder, and actuator means for actuating the injection means in accordance with the air pressure within the engine cylinder so as to ensure that the predetermined quantities of fuel are injected into the cylinder at appropriate times in relation to the combustion cycle of the engine.

The injection means comprises, basically, a fuel injection nozzle, a valve controlled supply chamber located behind the injection nozzle, means for admitting fuel to the fuel supply chamber, and a fuel piston actuated by said actuator means to compress the fuel in the supply chamber and to expel the fuel therefrom to the engine cylinder via the injection nozzle. The actuator means includes a spring-loaded shuttle valve arranged to move towards one or other of two limit positions in accordance with the gas pressure in the engine cylinder, and means for supplying pressurized hydraulic fluid to actuate the fuel piston in accordance with the position of the shuttle valve; the pressurized hydraulic fluid is fed from a chamber housing a free piston which is urged in a direction to expel hydraulic fluid from the chamber, expulsion of fluid from the chamber being controlled by the shuttle valve, which is arranged to cover and uncover a port leading to the chamber.

ARRANGEMENT AND MECHANICAL CONSTRUCTION

The fuel injector is illustrated in detail in FIGS. 18 to 26 of the drawings, of which FIG. 18 best shows the interrelationship of its working parts. Reference will now be made to these figures in particular.

In FIG. 18 is shown a portion of the engine cylinder 101, and portions of the engine pistons 104L and 104R which define a combustion space S in the engine cylinder into which fuel is injected by the fuel injector. The fuel injector itself is incorporated in a metal body 202, which is machined to provide a number of internal passages and bores as hereinafter described, and which houses the essential elements of the injection means and the actuator means referred to above.

The metal body 202 is formed with a stepped cylindrical bore 203, at the upper end of which is an assembly consisting of the injection nozzle itself 201, a spring-loaded valve 204 having a valve seat 205, a spacer ring 206, and another spacer ring 205A which may be of relatively soft metal such as mild steel, those parts being clamped and retained in position by an adaptor 207 which is screwed into the threaded upper end of the cylindrical bore 203. The adaptor 207 is located in a passage in the wall of the engine cylinder 101, to which the fuel injector body 202 is suitably connected, a sealing ring 208 being located so as to prevent leakage of gases from the engine cylinder.

Located within the cylindrical bore 203 is a cylindrical barrel 209, the barrel being a tight leak-free fit within the bore. A piston 210 having trunk extension 211 of slightly reduced diameter is slidably arranged within the barrel 209 to define a space 212, constituting a fuel supply chamber, between the upper end of the trunk extension and the valve 204. A compression spring 213 encircling the trunk extension 211 biases the piston 210 towards its lowermost position. Fuel is admitted to the supply chamber 212 through a port 214 in the barrel 203, the port communicating with a supply inlet via a passage 215.

Also located within the cylindrical bore 203 is a second barrel 216, this also being a tight leak-free fit in the bore. The bottom end of the piston 210 is castellated so that, as it is biased downwardly by the spring 213, a space 219 remains beneath the piston for the admission of hydraulic fluid.

A piston valve 220, which is a low clearance running fit in the barrel 216, is biased upwardly by a spring 221, the piston valve having a flange 222 against which the spring bears. Upward and downward movements of the piston valve 220 are limited by engagement of the flange 222 with a step 223 in the barrel 216, and with a sleeve member 224, respectively. The piston valve 220 is provided for the purpose of allowing rapid egress of used oil from the space 219 through an internal passage 225 of the valve. The passage 225 communicates via radial holes 226 with a shallow annular space 227 near the upper end of the valve. When the valve is in its upper position, the annular space 227 communicates with the space 219 and permits oil egress, and when the valve is in its lower position, the annular space 227 is isolated from the space 219. Thus the valve is closed in its lower position and open in its upper position.

The spring 221 is weaker, in terms of simple force, than the spring 213. However, in relation to the cross sectional areas of the piston valve 220 and piston 210, respectively, against which the springs act, the spring 221 is the stronger of the two. When therefore the piston 210 is moving outwards to expel the spent oil in space 219, the piston valve 200 will be open; but when the castellated end of the piston 210 reaches the inwardly extended end of the piston valve 220, the latter will cede and close. Thereafter introduction of high pressure oil into the space 219 will oppose the piston 210 and move it upwards, while simultaneously it will keep the piston valve 220 closed down.

In practice a very small leakage of oil from the space 219 is required when the piston valve 220 is closed, and for this purpose the upper end of the piston valve may contain a small longitudinal channel of appropriate cross section.

Any leakage of oil into the annular space between the piston extension 211 and the inner surface of the barrel 209 can pass out through a small hole 228 and a one-way valve consisting of an O-ring 229 located in an annular groove in the outer surface of the barrel 209.

A screw threaded hole 231 in the metal body 202 communicating with the passage 215 is adapted to receive a connector valve 232 (FIG. 26) whereby fuel is admitted to the passage 215 and thence to the supply chamber 212 via the port 214. The connector valve 232 comprises a valve body having a first stem portion 233, which is adapted to be screwed into the hole 231, a second stem portion to which a fuel supply line may be connected, and a flange 234 which is adapted to bear against the fuel injector body 202. Within the valve body is a valve member 235 biased towards its closed position by a spring 236.

The fuel injector body 202 is also formed with a second cylindrical bore 237, housing a barrel 238 which is a tight stationary leak-free fit within the bore. Mounted within the barrel 238 is a spring-loaded shuttle valve 239, to which is connected a downwardly extending hollow rod 240. A carrier cup 242 is free to move axially to and fro in a sleeve 248. A compression spring 241 contained within the carrier cup 242 acts upon the rod 240 to urge the shuttle valve 239 to its uppermost position, at which position the valve lies very close to, but is spaced from, the machined outer surface of the engine cylinder 101. The upper limiting position of the shuttle valve 239 is determined by the abutment of the carrier cup 242 against a flange 243 of a third barrel 244, the diameter of the flange 243 ensuring a tight leak-free fit in the fuel injector body 202. A central hole 245 in the top of the carrier cup 242 is aligned with the hollow rod 240 for receiving oil which leaks down the rod, this oil passing via a port 246 to the drainage passage 218. Downward movement of the carrier cup 242 is limited by a step 247 on the inner surface of the sleeve 248.

Means are provided to ensure that the port 246 remains in line with the corresponding hole in the fuel injector body 202, so that leakage oil may pass freely to the passage 218. The flange 243 is kept firmly locked against its seat in the body 202 by a screw 251, acting through the sleeve 248. A seal 299 is fitted round the top of the barrel 238 to prevent leakage of cylinder gas.

A passage 249 in the engine cylinder extends from the cylinder space 'S' (FIG. 18) to the space immediately above the shuttle valve 239, so that the latter is exposed to cylinder gas pressure and will be caused to move downwardly in the barrel 238 when the gas pressure exceeds a value determined by the force exerted on the shuttle valve by the spring 241. The force exerted by the spring 241, and hence the value of cylinder pressure at which the shuttle valve is moved downwards, can be pre-adjusted by any suitable means, such as an adjustable screw plug 250, located in the bottom end of the retaining screw 251.

The upper end of the barrel 244 is of reduced diameter so as to be a tight leak-free fit in a recess machined into the lower end of the barrel 238.

The working oil at suitable pressure is supplied to the fuel injector by way of a feed pipe (not shown) connected to an inlet adaptor 253 including a spring-loaded one-way valve 254. The oil passes via a passage 255 to an annular space 256 surrounding the stem 257 of the shuttle valve 239, and thence through a passage 258 leading from the barrel 238 into an oil space 259. The oil space 259 is defined by a cylinder 260 which is a tight leak-free fit in a cylindrical bore closed at one end by a screw-threaded metal plug 262.

The cylinder 260 contains a close fitting free piston 263, from inside which protrudes a spring loaded detent, 265.

These parts are shown in greater detail in FIG. 25, from which it will be seen that the detent 265 may slide back axially against the force of a spring, 281, and that the detent contains an oil groove to enable it to move freely to and fro in the oil filled spaces.

When oil pressure is the same on each side of the piston 263, another spring 282 holds the piston fully forward so that the detent 265 is pressed against the barrel 238. The spring 281 is made stronger than the spring 282 to ensure that under these conditions the detent 265 will be fully extended.

Behind the piston 263 is a space 266 of variable volume which communicates through a spool valve 267 with a space 268. The bottom of the space 268 is closed by a screw-threaded plug 269, provided with filling means 270. The plug 269 has an axially extending flange 271 to which is cemented a deformable container 272 made from a highly impermeable material with high chemical and physical resistance to oil, such as the material sold under the trade mark "Teflon". The container 272 is filled with a fluid of high compressibility, such as dimethyl siloxane, and is held at high pressure.

The admission of oil into the oil space 259 has the following result. If initially the free piston 263 is at its innermost position, (to the left as viewed in FIG. 18), then the piston is moved outwards by the flow of oil, displacing oil from the space 266 into the space 268 and causing the pressure in the container 272 to rise. The outward movement of the piston 263 ceases when the pressure in the container 272 is equal to the pressure in the oil space 259. When the gas pressure in the engine cylinder 101 attains a certain value at which the shuttle valve 239 is moved downwardly against the force of the spring 241, oil can no longer flow from annular space 256 down to passage 258, but when the shuttle valve moves to its lower position oil can flow from the space 259 into a passage 273.

The initial pressure in the container 272 is controlled by the spool valve 267, details of which are shown in FIG. 23. The spool valve 267 has an axially extending pressure equalizing bore 274, which allows free passage of oil between spaces 275 and 276 at all times; this spool valve is shown separately in FIG. 22, from which it will be observed that the valve is made from two bands of slightly reduced diameter 285, in order to render its action less abrupt. The spool valve 267 is positioned between a first spring 277 and a second, rather stiffer, spring 278. Behind the spring 278 is a slidable regulating rod 279 fitted with an O-ring seal 280.

When the force on the regulating rod 279 is completely removed by withdrawing an actuating rod 286 as far as it will go, then oil at high pressure from the passage 255 flows from the passage 283 via the circumferential groove in the spool valve 267 into the space 268, and brings it up to the same pressure as that existing in the passage 255; thus there will be no difference in oil pressure between the spaces 259 and 266 to press the free piston 263 back when the shuttle valve 239 rises to its uppermost position, as shown in FIG. 18. Under these conditions the relatively strong spring 281, which lies inside the free piston 263, pushes the detent 265 up to its shoulder and in so doing pushes the free piston 263 back a predetermined short distance against the force of the relatively weak spring 282. When the shuttle valve 239 is next depressed, the free piston 263 moves forward under the higher pressure in space 266, against the combination of the pressure in space 259 and the force on the detent 265. The free piston 263 is finally brought to rest when it reaches the barrel 238 (or when flange 264 reaches shoulder 261, if desired). This results in the oil contained in space 259 being impelled through passages 258, 273, 294, and into the space 219 to effect a limited stroke of the piston 210. Suitable proportioning of the extension of the detent 265 in relation to the position where piston 263 is finally stopped will ensure the correct amount of fuel required by the engine for idling, stopping, or starting. This correct amount will be sufficient to ensure enough flow through the pump units 107 during prolonged idling to prevent a harmful temperature rise.

A passage 287, (FIGS. 20 and 23) leads to the annular space 293 which exists between the barrel 238 and the bore 237, which has a low average pressure when compared with passage 255. When the spool valve 267 is pressed over to the left by means of the relatively strong spring 278 compressing the relatively weak spring 277, the circumferential groove in the spool valve connects the space 268 with the passage 287, thus allowing some of the high pressure oil in the space 268 to escape and so to lower the pressure therein. This has the effect of allowing a greater movement of the piston 263 before the pressures are equalized, so that more oil may be taken into the oil space 259.

A piston 288 (FIG. 23) sliding in a cylinder 289, which is bolted to the body of the fuel injector, may rest against the spool valve 267. A saw cut across the face of the piston 288 where it abuts against the spool valve allows free passage of oil through the bore 274 when the spool valve is moved. Oil pressure is applied to the piston 288 through an inlet adaptor 290, and when this pressure is sufficiently high, the piston 288 is able to override the spring 278 and thus prevent a fall of pressure in the space 268, or even increase that pressure. The pressure acting against the piston 288 is affected by constrictions 291 and 292, as hereinafter described.

When the shuttle valve 239 is in its lower position, oil leaves the space 259, impelled by the pressure within the deformable container 272 acting through the free piston 263. The oil flows through the passage 258 into an annular passage 293 within the bore 237. From the annular passage 293 the oil flows through a passage 294 into the oil space 219 beneath the bottom end of the piston 210.

The spring-loaded valve 204 of the nozzle assembly is of a reduced diameter just below its seating portion, to provide an annular region into which fuel is fed along axial grooves in the outer surface of the valve trunk. When this valve is opened by fuel pressure from below, its stroke is limited by a pad 295. The spring of the valve ensures a rapid valve return. Fuel flowing up through the valve passes through small holes 296 in the fuel guide and pad 295 and finally out through the nozzle 201. The nozzle 201 and fuel guide 296 are designed together to absorb as little compression energy as practicable from the fuel, as by way of viscous drag. They develop and retain maximum turbulence of the fuel, due to the 90° angular velocity change as the fuel passes across the sharp edge orifice of the injection nozzle 201.

Fuel Injector-Operation

With the assembly in the condition illustrated, at the moment when it is required to initiate a fuel injection sequence, the spring 241 is urging the carrier cup 242 with a force corresponding to the engine cylinder pressure. In this condition, oil at high pressure, say 5000 pounds per square inch, flows from the inlet adaptor 253 via passage 255 into the annular space 256, and thence into the oil space 259. The free piston 263 is forced outwards, compressing the oil in space 268 and the fluid in container 272 to the same pressure. When in due course the engine cylinder pressure reaches a predetermined value, the shuttle valve 239 is moved downwards to seal the annular space 256, and then to connect the oil space 259 with the annular passage 293. Prior to this sequence the piston 210 must have moved down and closed the piston valve 220; when the piston 210 is near the bottom of its stroke, the piston trunk 211 uncovers the port 214, so that fuel will flow into the fuel supply chamber 212. The free piston 263, under the stored energy of the compressed fluid in container 272, then expels oil from the oil space 259, through the annular passage 293 and into the space 219, thereby forcing the piston 210 upwards. The port 214 is then closed by the piston trunk 211, so that the fuel from the supply chamber 212 is expelled past the spring-loaded valve 204 and through the nozzle 201. Fuel delivery ceases abruptly when the free piston 263 reaches the inner limit of its stroke. During fuel delivery a small amount of the working oil passes down the axial passage of the piston valve 220, through the slightly reduced diameter referred to earlier; this causes a sharp drop in oil pressure when oil flow from the oil space 259 ceases, which in turn causes a sharp cessation of fuel flow from chamber 212 and rapid closure of the spring-loaded valve 204. With the reduction of oil pressure in the space 219, the piston valve 220, under the action of the spring 221, opens to allow oil in the space 219 to be rapidly expelled via the drainage passage 218 back to a pressurized oil storage reservoir.

On the expansion stroke of the engine pistons, as soon as the engine cylinder pressure falls to a value less than that exerted by the spring 241 on the shuttle valve 239, the latter returns to its upper position and oil again flows into the oil space 259 in preparation for the next injection cycle.

As will be described later, means are provided to prime the space in the injector, which space lies between delivery valve 204 and the outlet orifice in 201. This is done immediately before the engine is started, in order to make up for any loss of fuel by evaporation which may have occurred. For this purpose a specific volume of fuel is forced through the fuel system with sufficient pressure to lift the non-return delivery valve 204, and then to re-fill the specified space.

CONTROL GEAR FOR STARTING AND STOPPING

The control gear for starting and stopping the power unit is illustrated in FIGS. 27 to 33 of the drawings, and will now be described with reference to these figures in particular.

The control gear comprises a metal body 300, to which are bolted a top cover plate 301, a side cover plate 302, and a spacer block 303. An operating rod 304 is mounted for forward and backward sliding movement in a guide space defined by the cover plates and spacer block. A transmission rod 305, leading to the actuator rod 286 of FIG. 23, is pressed forward by the operating rod 304 when in the running position.

The metal body 300 houses a number of movable elements as shown, including a slide 306 arranged to move along an internal guide passage 307 inclined at 45° to the faces of the metal body 300, two spool valves 308 and 309, a pair of similar spring-loaded bolts 310, 311, and a spring-loaded detent 312. The body 300 is formed with a number of internal oil passages, providing a first inlet 313 by which moderate oil pressure is applied to the spool valves 308 and 309; an oil inlet 314 connected to the outlet ports 176 of the power unit via connecting pipes 515L, 515R; an inlet 315, connected to the delivery manifold 520 as shown in FIG. 41; an oil outlet 316 leading to oil connections 175 (FIG. 1) to operate the plungers 170; an oil outlet 317 leading to a vented reservoir; and an oil inlet 318 leading to the high pressure oil source which actuates the fuel injector.

When the operating rod 304 is forward, the slide 306 is depressed and the spool valve 308 is displaced from the position shown. A small undercut 334 on the slide 306 prevents the spool valve 308 from turning when it is forward. When the operating rod 304 is in its rearward position, the engine is stopped. The drawing shows the operating rod in its rearward position to stop the engine, so that the slide 306 and spool valve 308 occupy the positions indicated and the shuttle valve 309 has not yet responded to the "stop" signal.

When a force is applied by the operating rod 304, the spring-loaded detent 312 resists the initial movement of the slide 306, so that enough force is built up against the operating rod to depress the detent and cause the spool valve 308 to be moved to its alternative position in one quick movement. The slide 306 is moved along the guide passage 307, depressing the spool valve 308 by engaging a wedge-shaped deflecting member 319. When the slide has been displaced, there is no tendency for it to move, and the operating rod 304 can move freely until it encounters the transmission rod 305.

If there is sufficient pressure in the constant displacement accumulators 108 to start the engine, forward movement of the operating rod 304 is normally prevented by the spring-loaded bolts 310, 311, which are urged by springs, such as 320, to the position shown in dotted line in FIG. 27. Out-of-balance forces on the bolts are counteracted by rollers 321.

A pair of rams, 322 and 323 act in opposition to the springs 320, and when sufficient oil pressure is applied to these rams, through an oil chamber 324 by oil from a high pressure accumulator 550 (FIG. 41) via inlet 318, and through an oil chamber 336 by oil from the pumping space 107 via inlet 315, the bolts 310, 311 are retracted.

The spool valve 309 supplies oil to operate the stop plungers 170. In the condition shown in FIG. 27, the oil connections 175 (FIG. 1) are connected to the low pressure reservoir via an annular groove 325 of the shuttle valve assembly through oil outlet 317. When the spool valve 309 is moved to its upper position, high pressure oil from the inlet 318 flows along a neck 326 of the spool valve 309 to the oil outlet 316, and thence to the oil connections 175 for actuating the plungers 170.

As shown in the drawing, the spool valve 308 is in its outermost position and directs high pressure oil from inlet 318 through drilled holes 327 for actuating a ram 328. The spool valve 309 cannot move up, however, until it has been released by a bolt, 329; this bolt is engaged in undercut 332, under pressure from oil inlet 314 acting on piston 330. Pressure on the piston 330 can only be released during the compression stroke of engine pistons 104 at about the instant when re-compression accumulator piston 123 (FIG. 1) is brought to rest, as its flange 128 reaches the seat 129. At this point in the cycle of operations, the pressure in the pump chamber 112 is momentarily zero, and the plate valve 133 is starting to open. The time for the neck of spool valve 309 to reach the annular groove 333 is determined by the apportionment of the diameters of the ram 328 and the orifice 331 in relation to the pressure acting on ram 328 and the cross sectional area of spool valve 309. This time must be approximately equal to the time it takes for each of pistons 104 (FIG. 1) to complete both what is left of its compression stroke and most of its expansion stroke.

Pressure for controlling the bolt 329 is relayed from the right hand pump chamber 112 through outlet 176R (FIGS. 1 and 41) and via connecting pipe 515, by means that will be explained hereinafter.

In this way, it is possible with correct apportioning of the dimensions of the relative parts to ensure that the "stop" plungers 170 are advanced when the engine pistons have the least possible momentum, so avoiding excessive shock.

THE HYDRAULIC MOTORS

General

As previously mentioned, the output from the power unit is a flow of high pressure oil. In the present embodiment the flow of oil is used to drive four dual-torque reversible hydraulic motors connected to drive the four road wheels of the vehicle, respectively. The motors are equally adapted for forward and reverse driving, and each motor is adapted to serve as an active element of the vehicle braking system.

Each motor basically comprises a cylindrical casing forming a stator, and a geared rotor assembly comprising a sun gear which meshes with two pairs of planet gears, the sun gear being mounted on an output shaft to which a vehicle wheel is connected, and the pairs of planet gears being arranged respectively to receive high pressure oil from two inlet manifolds, whereby to drive the sun gear. The high pressure oil is of course the oil delivered from the output of the power unit. Oil from the gear assembly passes to an outlet manifold having an outlet duct. Braking is effected by constricting the flow of oil from the outlet manifold.

Arrangement and Mechanical Construction

One such motor is illustrated in detail in FIGS. 34 to 40, and will now be described with reference to these figures in particular.

Figure 34:
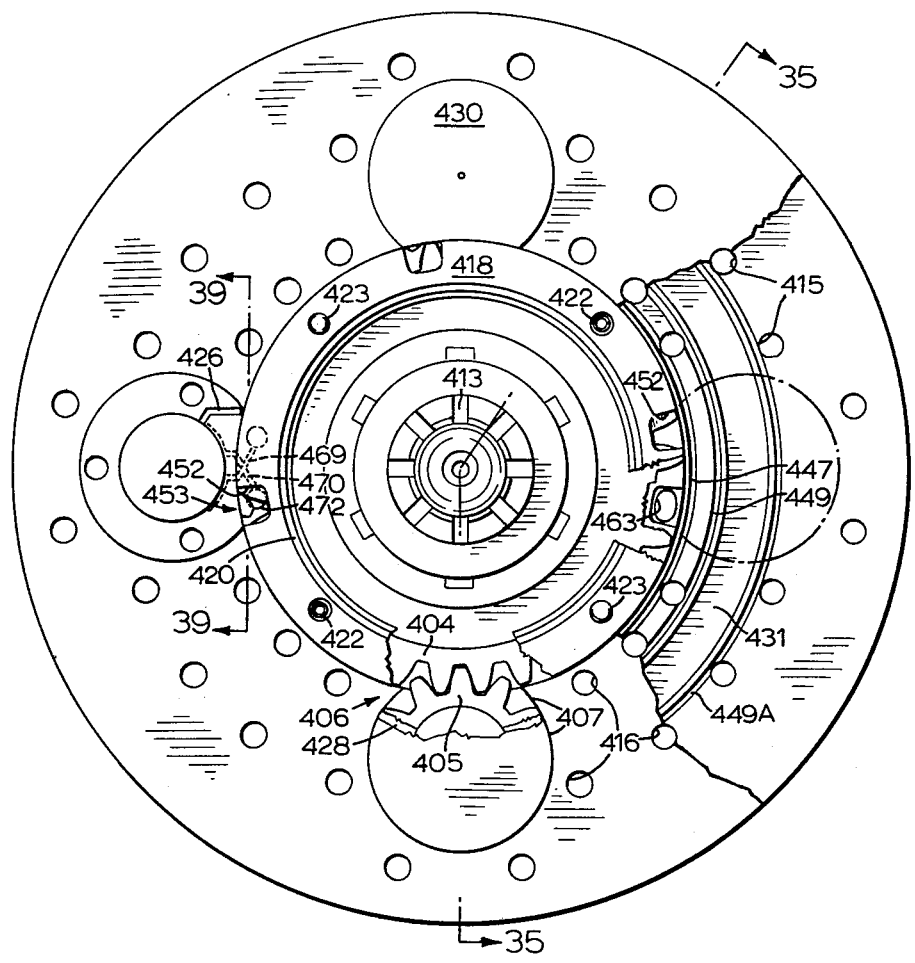
FIG. 34 is a partly broken away side elevation of a reversible hydraulic motor adapted for use with the power unit.
Figure 35:
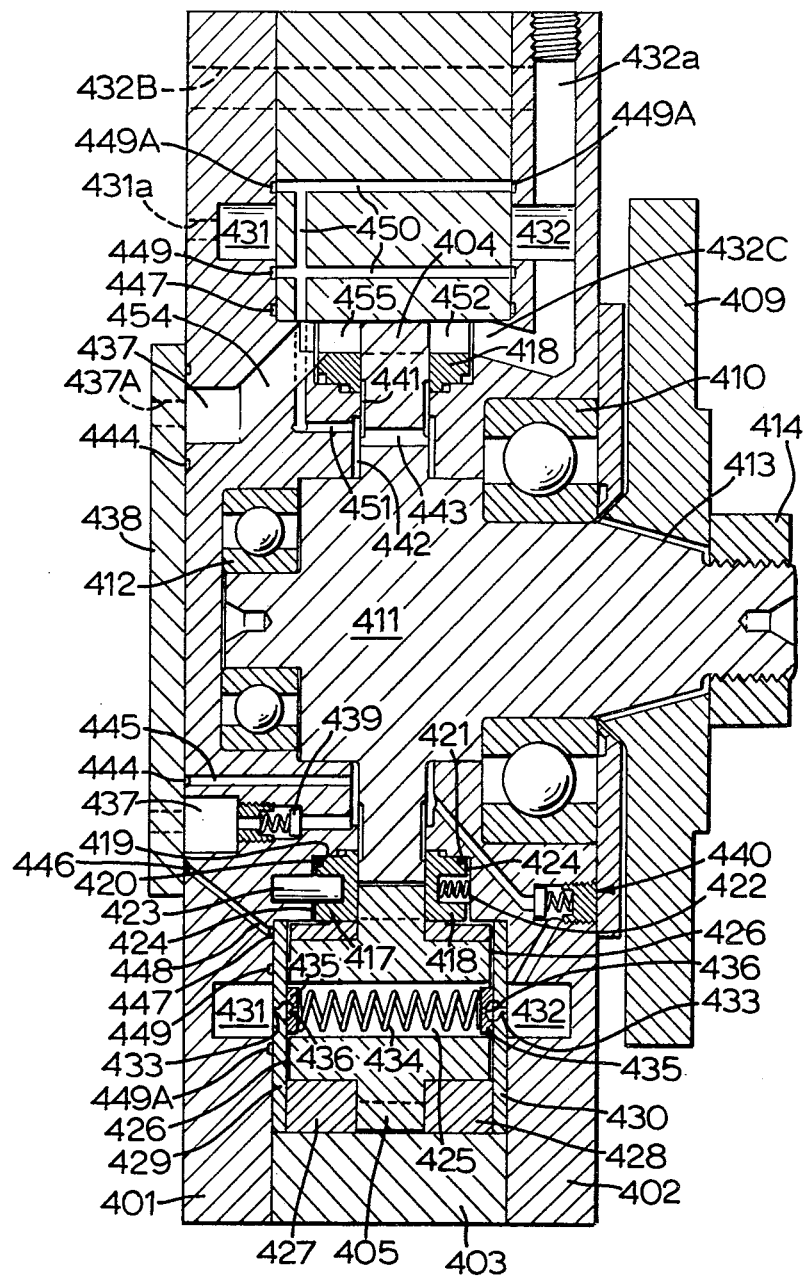
FIG. 35 is a section on line 35—35 in FIG. 34.
Figure 36:
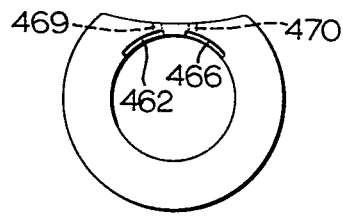
FIGS. 36 and 37 illustrate details of a planet gear bearing from opposite sides thereof.

The motor comprises a main casing consisting of an inner wall member 401, an outer wall member 402, and an enclosing ring 403 clamped between the wall members. The main casing houses a sun gear 404 bounded on its periphery by the enclosing ring 403 and two pairs of planet gears 405, the planet gears being equally spaced around the sun gear. In FIG. 34 a cut away portion 406 of end plate 430 and ring 418 reveals some of the intermeshing gear teeth. The encircling ring 403 is machined to provide two pairs of diametrically opposed, crescentic lobe-shaped, cavities 407 into which the planet gears fit exactly so as to be driven by incoming oil as hereinafter described.

The sun gear 404 is formed as a flange on a central main shaft 411, which is supported by two bearings 410 and 412, and at its front end carries a stud bearing plate 409, which serves to carry the wheel of the vehicle (the studs not being shown). The bearing plate 409 is bolted onto a splined taper 413, held in place by a nut 414. (In FIG. 34, the parts 409 and 410 have been removed).

The three main casing sections of the motor are held together by bolts (not shown) which screw into tapped holes such as 415 through transverse holes 416. The tapped holes 415 would normally be in the outer wall 402, but for illustration purposes are diagrammatically represented as being in the inner wall 401. The bolts pass through the encircling ring 403 and also the inner wall member 401.

Two exactly fitting rings 417 and 418, with outer diameters exactly equal to the outermost diameter of the sun gear 404, fit by means of a main inner diameter 419 on the shoulders seen on wall members 401 and 402, and are sealed by means of "O" rings 420 and 421. They are lightly pressed inwards against the sun gear 404 and the planet gears 405, by two or more springs 422, and are prevented from turning by two or more studs 423. A space 424 between the ring 417 and inner wall member 401, and a similar space between the ring 418 and outer wall member 402, are kept filled with oil under pressure from a pressurized space 425 via passages 426; these passages for illustration purposes are not shown in their true positions in FIG. 35, but are shown in their true positions in FIGS. 37 and 38.

Each of the four planet gears 405 is rotatably journalled in bearings such as 427 and 428. These bearings are a tight sliding fit, and a comparatively leak-free fit, in a space bounded by the four cavities 407 in the enclosing ring 403, and by the rings 417 and 418 and the corresponding shoulders in the wall members 401 and 402. Each planet gear is bounded by two end plates 429 and 430, each of which is a similar tight sliding fit in the bearings. These end plates separate the bearing and gear assembly from circular oil grooves 431 and 432, which are located in the inner faces of the wall members 401 and 402, and machined at a constant radius about the central axis of the motor. The groove 431 constitutes an inlet manifold, to which high pressure oil is fed through an inlet 431a from the oil delivery outlet of the power unit; the groove 432 constitutes an outlet manifold from which oil is led away via a passage 432a and 432b. Drainage grooves may be placed at the intersections of hole 432b and connected to grooves 449a. Each of the end plates 429 and 430 contains a small hole 433 which allows oil to pass into the space 425 extending axially through the planet gear 405. A spring 434 presses two valve plates 435 against the end plates 429 and 430. Each of the valve plates 435 contains a bleed hole 436. Springs (not shown) are fitted into pockets 408, and serve to push the faces of the bearings 427 and 428 against the faces of the planet gears 405, similarly to the way in which the springs 422 push the end rings 417 and 418 against the sun gear 404.

A further circular groove 437, constituting a second inlet manifold having an inlet 437a, is cut into the inner wall member 401 and is covered by the end plate 438, the latter being held by bolts (not shown) against the inner wall member 401.

One-way valves 439 and 440 are provided to allow oil to pass into the circular groove 437 or 432 according to which is at the lower pressure. These valves are oriented at any convenient angle and are only shown in their present position in the drawings for the purposes of illustration.

In this way a shallow circular depression 441 formed on each face of the sun gear 404 adjacent to a depression 442 in each of the wall members 401 and 402, and interconnected by a hole 443, is permanently kept at a relatively low pressure and serves as a sink for leakage oil.

A circular groove 444 on the outer face of the inner wall member 401 and covered by the end plate 438 is permanently connected to this low pressure sink by an axially extending passage 445.

Circular grooves 446 and 447 are connected together as shown by a passage 448. Circular grooves 449 and 449a are interconnected in the manner shown by a network of passages 450, which continues through the inner wall member 401, and via a passage 451 into the low pressure area. The grooves 447 and 449 are interconnected by the bolt holes that traverse them. The purpose of these grooves is to prevent any possible spread, and increase, in the area exposed to high pressure oil, and thus to minimize stress on the bolts that hold the assembly together.

Oil passes between the circular manifold 432 and each of the planet gears 405 by means of four passages similar to the passage 432c. A slot 452 is cut in the sealing ring 418, to allow the oil to pass through and enter the space between gears, as shown at 453, in FIG. 34. Oil passes between the circular inlet manifold 431 and one pair of opposite planet gears by similar means to those employed for the outlet manifold 432. The other pair of opposite planet gears are serviced by the circular inlet manifold 437 from two channels similar to 454, (which are likewise not in the circular position shown in FIG. 35); oil then passes through a slot 455 cut through the periphery of the sealing ring 417.

Axial clearance between the inner faces of the bearings 427 and 428, and the gears themselves, is minimized by oil pressure from the axial bore 425. This pressurized oil traverses the planet gear, and acting on each end of the bearing assembly, balances the pressure from the faces of the gears to keep bearings 427 and 428 snugly against them. This same oil pressure forces the end plates 429 and 430 outwards away from the bearings and thus seals all the circular grooves. Some of the oil flows via the passages 426 to perform a similar function against the sealing-rings 417 and 418. The pressure of oil in the hole 425 is controlled by the relative sizes of the inlet oil passage 433, from whichever of the oil manifolds is under pressure, and the oil-bleed 436 in valve plate 435, to whichever of the manifolds is at used-oil-pressure. The inward force of the rings 417 and 418 may be further adjusted by the radial positioning of the outer wall of the depression 441.

When the motor is running under pressure, radial forces on the sun gear 404 are all balanced out, but this is not necessarily so in the case of the four planet gears. In FIG. 40 the outside tooth diameter of a planet gear 405 is represented by a circle 456, and the root diameter is represented by a circle 457. The planet gear is entirely enclosed, in the clockwise direction as shown in the figure, from the points 458 to 459. The planet gear meshes with the sun gear 404, in which the outside tooth diameter is represented by a line 460 and the root diameter by a broken line 461. Oil enters or leaves the assembly by the slot 452 in the ring 418, and by a slot 463 (shown in dotted lines) situated on the other side of the planet gear in the ring 417. If the gear motor is being pressurized by oil through the slot 452, then it will be under pressure all the way round from the centre line 464, in a clockwise direction to the point 459. This oil pressure will diminish according to the amount of leakage between the gear and the main casing. Assuming that there is no significant leakage of oil, then the whole planet gear will be under full pressure, except for an area lying between the centre line 464, and the point 459; there will be a resultant force acting approximately in the direction of the vector 465. To avoid the resultant imbalance of forces, two small depressions, such as 466, (indicated only, since the bearing in which they are machined is not shown in FIG. 40) machined in one side of each bearing are filled with oil directly from the inlet slot 452 in the sealing ring 418 and a correspondingly blank hole 472 drilled into the sealing ring 417, which feeds a similar depression in the bearing that supports the other side of the planet gear, as shown at 39—39 in FIG. 34, and in FIG. 39. This exerts a nearly opposite counterforce, vector 467, and the two will give rise to a much smaller net resultant, indicated by vector 468. In this manner the excessive out-of-balance forces on the bearings can be reduced to an acceptable level. When the torque of the motor is reversed, opposite pressures oppose the out-of-balance force in just the same way from pressure entrance 463 to depression 462.

Figure 39:
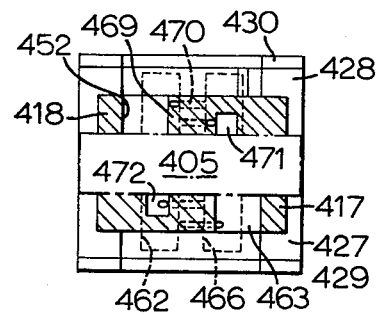
FIG. 39 is a section on line 39—39 in FIG. 34 with certain parts removed, showing a planet gear without details of its teeth.
Figure 38:
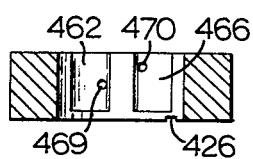
FIG. 38 is a section on line 38—38 in FIG. 37.
Figure 37:
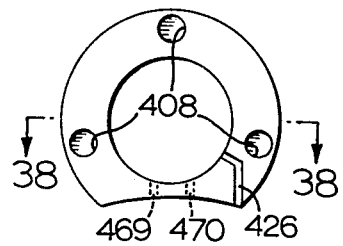
Figure 40:
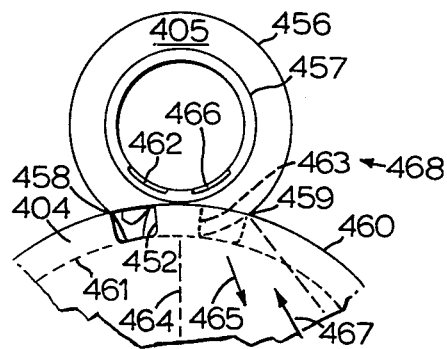
FIG. 40 is a schematic view of a gear wheel of the motor.

Oil passages 469 and 470 for this purpose are indicated in dotted lines in FIGS. 34, 36, 37, 38 and 39. FIGS. 39 and 40 show that the oil may be led across the centre line 464 through the gears. The figures also show how, for clockwise rotation of the planet gears, oil will be fed from the slot 452, which is at high pressure, and from the hole 472 to the oil pressure pads 466. For anti-clockwise rotation, the slot 452 will be at low pressure, and a similar slot 463 in the sealing ring 418 and corresponding hole in the sealing ring 418 will be at high pressure, oil being fed through similar passages to pads 462. Oil enters on only one side, since there is only one slot on each side of the sun gear for running purposes.

Hydraulic Motor Operation

In order to operate the motor for vehicular use at half the maximum torque, high pressure oil is piped from the power unit to the inlet manifold 431, and comparatively low pressure oil is piped to the inlet manifold 437. The oil passes from the gear motor assembly into the outlet manifold 432 and is piped back to the pressurized oil reservoir. For maximum torque, high pressure oil is piped to both of the inlet manifolds 431 and 437, in which case both pairs of planet gears are driven, the used oil passing to the outlet manifold 432 and being piped back to the pressurized oil reservoir as before.

In order to operate the motor in reverse, high pressure oil from the power unit is piped into the manifold 432, which thus serves as the inlet manifold, and is returned to the pressurized reservoir via the manifolds 431 and 437, which thus serve as the outlet manifolds.

In order to apply a braking torque, the flow of oil from the outlet manifold, or manifolds, is restricted at some position in the outlet system.

The motor may be modified to serve as a single torque reversible motor by omitting the manifold 437 and one pair of planet gears.

OVERALL SYSTEM

Arrangement and Mechanical Construction

The general assembly of the preferred embodiment of the invention is illustrated diagrammatically in FIG. 41, and will now be described with reference to this figure in particular.

FIG. 41 shows the ancillary components of the overall system together with the power unit 100, the fuel injector 200 mounted at a central position with respect to the power unit, the starting and stopping control gear 300, and four single torque reversible hydraulic motors 400, the latter being arranged to receive the pressurized oil delivered from the power unit and driven in a controlled manner as subsequently described. The motors 400 are substantially as hereinbefore described but in this case are adapted to operate on a single torque principle. One pair of motors is referenced 400L and the other pair is referenced 400R.

A device 51 for automatically controlling the energy storage capacity of the first hydraulic accumulator sections 108, by controlling the gas pressure in the spaces 124 (FIG. 1), comprises a spool valve 501 backed by air at inlet pressure from a manifold 502 and assisted by a spring 503. This spool valve is urged in opposition to its spring bias by a piston 504. The piston 504 is actuated by the oil pressure in a pipe 506, which leads from a port 505, and to valves 66 and 67. A drainage port 507 leads via a pipe 508 back to a pressurized oil sump 68, which will be described hereinafter. Another port 510 allows oil to enter the device 51 from an output pressure manifold 511 of the power unit by a pipe 512. Oil leaking from the spool valve passes out via a hole 513 down to a vented reservoir 514. In the position shown, the force exerted by the piston 504 is greater than the combined force exerted by the spring 503 and the air inlet pressure, and so the spool valve is down, thus lowering the mean pressure of accumulator sections 108. However, if the intake air pressure at manifold 502 is raised, a point will be reached when it will drive the spool valve 501 up against the face of the piston 504 and allow the higher pressure oil from the output manifold 511 to pass from the port 510 to the port 505, at the same time cutting off loss of oil from the ports 505 and 507; mean pressure will then rise in the constant displacement accumulators 108 until the piston 504 is forced down when equilibrium is reached.

The purpose of the valve 67 is to keep the engine pistons 104L and 104R in opposed synchronization. For this purpose two similar peripheral grooves, 119 (FIG. 1) are situated, one at each end, in the bore in which each of the pump pistons 113 slides, and so placed as to be uncovered by the pump pistons 113 when the latter are nearly fully forward. When the engine pistons are at about the innermost position, the one-way inlet valves 133 close, and there is a rapid pressure rise in each of the pump chambers 112, and in each of the grooves 119.

If both the engine pistons are exactly in opposition, each of the grooves 119 are exposed to the pump chambers 112 for the same length of time. If however they are at all out of phase, for example if piston 104L is ahead of piston 104R, then the groove 119L will be uncovered sooner than the other groove, and will be closed to the pump chamber 112 later.

The value of:

Pressure x Exposure Time will then be greater in the one groove 119L than in the other groove. It will next be shown how this effect is used to continually correct any tendency for the engine pistons to depart from perfect opposed synchronization.

Under these conditions oil from the first groove 119L (which is uncovered sooner) is led to an outlet and one-way valve 185L, FIG. 41; oil from the second groove 119R is led in the same way to a similar one-way valve 185R. Pipes lead from each of these one-way valves to a differential or synchronizing valve 67.

The synchronizing valve 67 consists of a shuttle valve member 186, lightly held in the position shown, when at rest, by similar springs 187. An oilway, 188, is always open to a neck 189 and is attached to pipe 506. Two further oilways, 190L and 190R lead through pipes 191L and 191R to the oil operated control spaces 125L and 125R in the constant displacement accumulators 108L and 108R. The shuttle valve member 186 is hollow and is always in communication with an oilway 192 which leads via pipe 193 back to the pressurized oil sump system. Two bleed holes 194L and 194R allow oil from the one-way valves 185L and 185R to leak into the shuttle valve 186 and away through oilway 192. Since the pressure surge, which occurs while the grooves 119 are exposed to the pump chamber 112, cannot pass back through the one-way valves 185, it is stored to some extent in tubes 195L and 195R until it escapes through the bleed holes 194L and 194R. This effect may be increased if required by using comparatively large flexible tubing for each of the tubes 195L and 195R; alternatively an accumulator may be used.

When the engine pistons 104L and 104R are operating correctly in opposed synchronization, the shuttle valve member 186 is in the position shown in FIG. 41, and so the pressure is practically the same in each of the pipes 191L and 191R and constant displacement accumulators 108L and 108R. If, however, the piston 104L gains an advance over the piston 104R, the value of:

Pressure x Exposure Time will become greater for the former than for the latter pistons; the shuttle valve 186 will then be biassed towards the right. This will allow some of the control oil in space 125 (FIG. 1) to return to the pressurized sump system 639 (FIG. 41) by way of shuttle valve neck 196 and oilway 192. Pressure in space 124 (FIG. 1) will then fall, so that its mean effective pressure, and therefore the energy accumulated while the piston 123 is performing its compression stroke, will be less than it was on the previous stroke. With less energy available to overcome compression between engine pistons 104L and 104R, the inward displacement distance of engine piston 104L will be reduced, with a consequent reduction in the exposure time of the first groove 119L to pressure in the pump chamber 107. This adjustment will continue until both engine pistons are effectively moving in synchronized opposition.

If instead, the piston 104R should draw ahead of the piston 104L the same changes will occur in the opposite direction. In this case, however, when the shuttle valve member 186 moves to the left oil flows into the neck 197 and down into the value 186 and out through hole 198 and oilway 192.

By these means the engine pistons are always kept in opposed synchronization.

A pipe 515L is attached to the outlet 176L of the constant displacement accumulator 108L of the power unit; a similar pipe 515R is attached to the outlet 176R of the other constant displacement accumulator 108R. Oil for charging the high pressure part of the machine is introduced through two non-return valves 516L and 516R. The pressure in the pipes 515L, 515R pulsates with the pressure in the hydraulic pump units 107 of FIG. 1. Leading from one of these pipes, for example 515R, another pipe 551 conveys oil to a pulsation and pressure control valve 57 (see FIG. 41). This control valve serves three purposes: first it ensures that the engine can only stop when suitable conditions of minimum power and correct intake air pressure prevail; secondly it ensures a controlled pressure to operate a hydraulic oil pump motivated by medium pressure oil, the purpose of which will be described hereinafter; thirdly it eliminates high cyclic pressure differences in the tube 363 (FIG. 41) during normal running.

Valve 57 consists of a spool 356 which is urged downwards to the position shown by a spring 357. When it is in the position, an oilway 358 attached to the pipe 551 is given free access, by a neck 359, to an oil outlet 340. The oil outlet 340 leads to the entrance hole 314 of FIG. 27, so as to control the bolt 329 as already explained in connection with FIG. 27. The spool 356 contains a passage 360 which is connected by a metering orifice 361 with the neck 359. Pressure at the oil outlet 340 acts through the metering orifice 361 and passage 360 to act on the lower surface of the spool 356 to oppose spring 357. The dimensions of the spool 356 and spring 357 are so adjusted that when the engine is idling the average pressure transmitted from the pump units 107 (FIG. 1) against the spool 356 produces insufficient force to overcome that exerted by spring 357; the spool 356 therefore stays in the position shown in the drawings. However, when power from the engine is appreciably increased so that the average pressure in the pump chambers 112 rises, it will overcome the force of the spring 357 and the latter will cede; the spool 356 will then move up until it covers the oilway 358. As the pressure acting on the spool 356 is the same as that existing at the oil outlet 340, and the spool valve rises to block the oilway 358 whenever this pressure becomes sufficient to overcome the force of the spring 357, the pressure at the oil outlet 340 can never substantially exceed the pressure exerted by spring 357, even though the average pressure of the pump chambers 112 may rise substantially. The spool 356 may have a portion of slightly reduced diameter, as indicated at 362, in order to increase its response time.

A pipe 518 is attached to the gas vents 138 (FIG. 17) of the smoothing accumulators 109, to ensure identical pressures in their gas spaces 137. Gas can be inserted through a filler 519.

Output oil pipes 520 lead from the high pressure oil delivery outlets 140 in the pumping units of the power unit and lead to the common pipe 511, connected to a pressure control device 52. The purpose of the pressure control device 52 is to ensure that the delivery pressure into the oil pipes 520 always exceeds the pressure of the accumulators 108. Without this, under conditions of very low pressure demand, oil delivered from the pump units of the power unit would pass straight through the plate valves 134 without energizing the constant displacement accumulators 108, and the engine would stop. The device 52 consists of a piston valve 521, which is able to close onto a seat 522. The valve 521 is biased by a spring 523, and is loaded by oil at the oil control pressure of the oil space 125 (FIG. 1) through a valve 66 (the purpose of which will be described hereinafter) from pipe 506. It will be seen that when pressure in the common pipe 511 appreciably exceeds the combined pressure exerted by the spring 523 and oil from the space 125, the piston valve 521 will open all the way and produce only a minor pressure drop oat this point. However, the pressure must be greater than the operating pressure of the constant displacement accumulators 108.

For the purpose of obtaining a low power output, for example to provide the power required to drive an average automobile around city streets or to cruise along a country road, an engine of the dimensions envisaged would require only intake air at atmospheric pressure. For hill-climbing, hard acceleration, or driving at high speed, the intake air pressure should be boosted. Exhaust turbines and compressors that would be suitable for this purpose are well developed in the art, and will not be dealt with in this specification. The device 146 of FIG. 1 provides a method of controlling and using an exhaust turbine powered compressor. An alternative method is provided by the device 65 shown in FIG. 41. In this case gas from the exhaust ports, (shown covered by a heat resisting cover 525, to the right of the fuel injector 200) passes into a pulsation attenuating space 526, and from there into an exhaust turbine 527, after which it is led out through an exhaust port 528, to be taken to a silencer (not shown). A centrifugal clutch 529, is designed to operate when the ratio of fuel to air in the engine reaches a certain value, say 1 : 24, as evidenced by the exhaust turbine attaining a specified speed. When this specified speed is reached, the centrifugal clutch 529 engages and a compressor 530 starts to revolve. Up to this time air has been coming in through the compressor entrance 531, to pass freely through the compressor and leave via manifold 502. An air filler can be fitted to the compressor entrance 531. Six ports similar to 532 on the power unit 100 admit air into the engine. The passages connecting these ports to the manifold 502 are not shown. An air cooler (not shown) would preferably be included to lower the air temperature after the air leaves the compressor 530. These would be constructed according to established practice.

An electric generator 533 and a coolant pump are arranged to be driven by the gas turbine shaft. Six further ports 534, three adjacent each end of the engine cylinder, delivers air through one-way delivery valves after compression by the engine pistons, and take it via a surge attentuator and preferably an air cooler (neither of which is shown as they also could be constructed according to standard practice) to the engine cylinder air inlet 148.

A control device 53 for preventing output oil pressure from rising above the desired maximum value, comprises a plunger 535, which is a low clearance sliding fit inside a hydraulic spool valve 536, fed by output oil through a pipe 537 from the output oil manifold 520. Normally the spool valve 536 is pressed against a shoulder on the left hand side, as shown in the drawing, by a spring 538. A pressure equalizing hole 539 extending right through the spool valve 536 allows the latter to move freely in each direction. A port 540, leads via a pipe 541 to the inlet nozzle adaptor 290 of the fuel injector 200. A port 542 leads to a pipe 543, which conveys oil back to the pressurized reservoir 68. The plunger 535 and spring 538 are so dimensioned that when the output oil pressure in pipe 520, acting on the plunger 535, reaches the desired maximum pressure, the spool valve 536 moves back against the force exerted by the spring 538 to uncover the oil port 540.

The power output of the engine is increased by applying pressure to the actuating rod 286 by means of an inverted L-shaped lever 544, which could be depressed by the actuating rod 305 under the influence of the operating rod 304. The operating rod 304 could be advanced in the first instance by an accelerator pedal. Under certain conditions, as for example when accelerating a vehicle very hard at a low speed, or when climbing a steep hill at perhaps two thirds of the top speed, it is possible to raise the oil output pressure to above the designed limit, and thereby to develop more power than could be used at these speeds. If this occurs, then as explained in the previous paragraph, the oil port 540 is uncovered and oil flows at the limit pressure along the pipe 541 and into the inlet adaptor 290 (FIG. 23). This oil acts on the piston 288, as explained earlier in connection with FIG. 23, to press the spool valve 267 over to the right against the force of the spring 278, thus overcoming whatever force might be applied to accelerate the actuating rod 286. Oil entering past the constriction 291 (FIG. 23) leaves via the constriction 292, the relative areas of these two constrictions giving a measure of control over the pressure acting on the piston 288. The pressure drop due to passage of oil passing through the restriction 292, is the actual pressure acting on the piston 288. By these means it is impossible to overload the system by running it above the designated pressure. A safety system is incorporated by the addition of a port 542 in the device 53; in case of any kind of actuating failure causing the pressure to rise above the required limit, then the spool 536 will move still further back against the spring 538 and thus allow the oil to escape back to the pressurized reservoir 68.

The high pressure oil that is required to power the fuel injector is produced by means of devices 54, 55 and 56. This same oil is used to operate the "stop" plungers, 170 of FIG. 1, which are housed in casings 545. The device 54 is a one-way valve designed with a very short response time, so that it can take oil in during the brief pressure surges that occur in the pump chambers 112 when the engine is idling. In FIG. 41, an element 55 represents a hydraulic accumulator providing a capacity which will store oil between surges. A high pressure pump 56 motivated by medium pressure oil is provided. This pump will raise the pressure at this location to whatever is required by the fuel injector 200, and the 'Stop' plungers, 170 (FIG. 1). For example, 5000 pounds per square inch could be required by the fuel injector, compared with an available 400 pounds per square inch delivery pressure in the feed pipe 551.

The oil whose pressure is to be raised is taken from the vented reservoir 514 and enters the constant pressure ratio high pressure pump 56 by oilway 552. It is then delivered via oilway 554 to a high pressure accumulator 550. The motivating oil enters by oilway 599 from accumulator 55 and valve 54; after its energy has been spent, it leaves by oilway 553 to return to the pressurized oil sump system 593 and 68. When sufficient pressure is available at the oilway 599, the pump 56 will function automatically whenever thee outlet pressure falls below the required value.

The pressurized oil sump 68 must be able to contain all the oil that is expelled from the accumulators 109 and 108 when they adjust from maximum to minimum pressure. The sump consists of a large hollow cylinder 555, in which a free piston 556 is able to move back and forth as dictated by differences in oil pressure acting on its top face 557 and its inner area 558. The free piston 556 may ride on two seals 559. Oil is supplied to the bore 600 of the free piston from a control valve 69 by a hollow stationary piston 601, sealed by a ring 602. Leaking oil is conveyed away from vent 603 back to the vented reservoir 514.

The control valve 69 contains a shuttle 604 balanced between oil at pressurized oil sump pressure on one end 605 and a spring 606 at the other. When pressure in the sump line 593 exerts less force against the shuttle 604 than does the spring 606, the shuttle rests in the position shown in the drawing.

Oil at the delivery pressure from the output manifold 520 enters the valve 69 through an oilway 608 and (when the shuttle 604 is in the position shown in the drawing) leaves by oilway 607. The areas 557 and 558 are so proportioned that the output manifold delivery pressure, when exerted against surface 558, is always greater than the pressure caused by spring 606 pressing against the shuttle 604. Therefore when, under working conditions, the piston 556 and valve 604 are in the positions shown, the piston 556 must be moving up. Conversely if the pressure in the sump line 593, acting against the shuttle valve 604, gives rise to a force appreciably greater than that exerted by the spring 606, the valve will yield, at first closing oilway 607 and then opening it to the cylinder 509. Under these conditions the pressure exerted against the surface 558 is identical with that exerted against the surface 557, and as the area of surface 557 is greater than the area of surface 558, piston 556 is impelled down.

Oil after leaving the valve 52 enters a manually operated valve 58 whose function is to reverse the direction of the oil. In the position shown, oil passes from a port 560 along the left hand neck of a valve spool 570 and out via a port 561. After use, the oil returns via a port 562, passes along the right hand neck of the valve spool 570 and leaves it via a port 563. If the valve spool 570 is pushed to the left, oil passes in via the port 560 and out via the port 562. Used oil then enters the valve by the port 561 and leaves by the port 564. The ports 560 to 564 completely encircle the cylinder so as to avoid the effects of radial pressure. A window 565 connected only to a return oilway 566 does not completely encircle the cyclinder, but occupies somewhat less than 180° of the cylinder periphery. Opposite the window 565 lies another window 567 of equal dimensions, which is connected by an oil duct 568 to a main working pressure oilway 569. The purpose of the windows 565 and 567 is to prevent the valve spool 570 from being moved while the oilway 569 is under pressure; the oil pressure acting through the high pressure window 567 pushes the valve spool 570 against the low pressure window 565 and thus applies high frictional resistance to movement of the valve spool 570. Further means are provided to prevent the valve spool 570 from being actuated if the vehicle is in motion, as will be described hereinafter.

Each of the motors 400 is attached to a respective wheel of the vehicle. A valve 59 makes it possible to obtain traction with either two or four wheels, and thus to double the traction force when required. When a spool valve 571 is in the position shown, oil passes from valve 58 down through the oilway 572, valve 59, oilway 573, to energize the two motors 400L; at the same time oil passes through an oilway 574 to energize the motors 400R. Under these conditions all four motors are in traction. The spool valve 571 is under the control of two forces: a spring 575 pushes it towards the left and a hydraulic ram 576 pushes it towards the right. When the spool valve 571 is over to the left, the connection between oilways 572 and 573 is severed and only the motors 400R are in traction. Under these conditions an automatic valve 578 leading from the pressurized reservoir 68, opens to keep oil flowing through the motors 400L.

The selection of two or four wheel drive can be determined manually up to a certain vehicle speed, according to the desire of the operator, or it can be controlled automatically depending upon the resistance to motion and the speed of the vehicle. In order to engage all four wheels manually, the operator momentarily energizes a double solenoid actuator, 579. In order to revert to two wheel drive, he momentarily energizes the other half of the actuator 579. The first operation lifts a plunger valve 580 into the position shown, and thus allows high pressure oil from the oilway 574 to flow into an oilway 585; after passing through a spool valve 581, this oil acts upon the hydraulic ram 576, and pushes the spool valve 571 over to the right. Actuation of the other solenoid pulls the plunger valve 580 down to its original position. Above a certain vehicle speed the pumping sections of the power unit are unable to generate sufficient oil pressure to maintain the vehicle in a four wheel drive condition. For the purpose of reverting to two wheel drive, a flange 850F fits into a wide slot cut into one end of the spool valve 581. Oil pressure acts upon the upper end of the spool valve 581 in the space lying between its greater diameter and its lesser diameter, 581A, the whole area being exposed to pressure at the lower end. If, therefore, equal oil pressure is acting upon each end, the spool valve 581 must rest in the upper position as shown. The lower end of the spool valve is exposed to oil taken from the low pressure point 582 of a venturi tube 583 through which the working oil passes. The reduced upper area of the spool valve 581 is exposed to a high pressure point in the same oilway. At low oil speeds the spool valve 581 rests in the position shown, but when the oil speed is great enough, depending upon the dimensions of the parts concerned, the force acting on the lower part of the spool valve 581 becomes less than the force acting upon the upper part of valve 581, so that the latter descends and takes the spool valve 580 with it. Oil flow is then cut off from the space 589, (referred to subsequently,); the spool valve 571 moves to the left to cut off the working fluid supply to the motors 400L. A detent 584 is installed in the assembly to ensure fast positive movement of the device.

Automatic determination of two or four wheel drive is effected by a valve 60. This consists of a two diameter plunger valve, the larger diameter H-1 being a low clearance sliding fit in a barrel H-2, the smaller diameter H-3 being a low clearance sliding fit in a barrel H-4. A peripheral duct H-5 allows oil to pass from a pipe H-6 to a pipe H-7 when the valve is forced down. A spring H-8 normally holds the valve up and closed. If the resistance to motion exceeds a certain value, represented by an oil pressure near the maximum allowable, for instance 2800 p.s.i., then this pressure forces the smaller diameter plunger H-3 down against the force of the spring H-8; oil then flows into the pipe 585, through the spool valve 581 and into a space 589. The oil acts on the hydraulic ram 576 and forces the valve 571 to the right, thereby doubling the traction. This causes the oil pressure to fall to about half its former value. The larger diameter of plunger H-1 is of such an area that the spring H-8 is unable to close the valve, once opened, until the oil pressure due to resistance to motion falls to somewhat less than half the allowable maximum pressure, for example say 1000 p.s.i. Thus, when the valve does close and the oil pressure therefore immediately doubles, this new pressure is sufficient to open the plunger H-3 immediately.

The outlet pipe H-7 passes through the venturi controlled spool valve 581, as shown, so that it gives no access of oil to the chamber 589, until the speed of the vehicle is low enough for its oil volume demand to be capable of being satisfied by the pumps 107 of the power unit.

A device 61 is provided for arresting the vehicle's motion by restricting the flow of used oil from the hydraulic motors. For this purpose the braking command is applied to a rod E-1, which by forcing a spool valve E-2 up constricts the outflow of oil from the motors 400L and 400R as the oil passes between the oilways 566 and 593. A hole E-4 connects the underside of the piston to the low pressure oilway 593. Upward displacement of the piston is limited by a projection, E-5. A spring E-3, returns the spool valve E-2 to the position shown when pressure on the rod E-1 is released.

When pressure rises in the oilway 594, it opens the valve 590, and enters the space 589 to force the ram 576 and valve spool 571 over to the right to the position shown, thus ensuring braking effect on all four wheels.

An orifice 591 in the ram 576 allows oil to flow from the oil space 589, but it is too small to reduce significantly the pressure therein when oil is entering the chamber. A one-way valve 596, prevents oil from leaving the space 589 through the oilway 597.

A hydraulic plunger E-8 consisting of a full diameter and a neck as shown, is open to the pipe 566 on the lower end. The plunger is normally held in the position shown by a spring E-9, supported in a free-fitting cup E-10. The force exerted by the spring E-9 against the plunger E-8 is such that it is equal to the opposite force exerted by the oil on this same plunger, at the maximum permitted pressure for the components. Above this pressure the plunger E-8 rises to uncover a circumferential groove E-11 and allow oil to pass into the space E-7. At the same time the trunk of plunger E-8 covers an exit oilway E-12 to close escape of oil from space E-7. As a result of this, pressure rises in the space E-7 and, overriding the braking force applied to the rod E-1, forces the shuttle valve E-2 down; this reduces the flow restriction between the oilways 566 and 593, and thus prevents the braking oil pressure from exceeding the maximum designed value.

A one-way valve, E-6, is inserted to allow oil into the passage 566 whatever the position of the spool valve E-2. Because of this, oil is always available if the brakes are locked on, as when the vehicle is stationary and on a hill, whether the manually operated valve 58 is in the forward or the reverse position.

The control valve 66 (FIG. 41) is an automatic pressure operated valve whose function is to ensure closure of the valve 52 in emergency braking, if, for example, the brake pedal is depressed before the accelerator pedal is released. It consists of a normally open spool valve 612 subjected on one side 613 to the braking oil pressure and on the other side to the action of a spring 614. When the brakes are applied, pressure rises in the spaces 566 and 613 to force the spool valve 612 over to the right against the action of the spring 614. This action closes the oilway 615 and opens the oilway 616 to oilway 617 so as to admit the pressurized oil to the space 618 behind piston valve 521. When the braking pressure in passages 616 and 617, combined with the force of spring 523, exceeds the pressure in the output pressure manifold 511, the piston valve 521 closes.

In order to ensure that the reverse valve 58 can only be operated when the vehicle is stationary, the operating rod 570R contains two gates: E-14, and E-15. These gates are also shown in FIG. 42. The brake operating rod E-1 also contains a gate, E-17 which is indicated by dotted lines in 61 and is also more clearly shown in FIG. 42 and FIG. 43, the latter being a sectional elevation through 43—43 in FIG. 41. It will be seen that unless the brake rod E-1 is pressed all the way in, it is impossible to slide the reverse rod 570R in either direction; also it is impossible to push the brake rod E-1 all the way in until all motion has ceased, because to do so would involve completely closing valve E-2. Any attempt to do this would raise the pressure in the space E-7 sufficiently as to arrest the braking effort. A stiff spring might usefully be interposed between the brake rod E-1 and the operating means (for example the brake pedal) in certain applications.

In reverse, pressure in the oilway 594 causes the valve 590 to open and so ensures that both sets of motors 400L and 400R are in traction.

If at any time the power output of the engine is drastically reduced while the vehicle is in motion, insufficient oil may flow from the pumps of the power unit to keep the hydraulic motors full. To prevent this, a one-way valve 595 will open to keep the system full of oil.

As it is necessary when the engine is idling to keep some circulation of oil through the main pump units 107 so that they will not accumulate excessive frictional heat, means must be provided to dispose of this oil if the vehicle is stationary. For this purpose a pressure operated valve 610 may be installed in the one-way valve 595; this would be designed to remain open until the oil reached a certain moderate pressure and to close when this pressure was reached. The critical pressure at which the valve closes is preferably significantly less than the 'break-away' pressure required to set the vehicle in motion. The valve may consist simply of a circular, slightly curved piece of spring steel, kept in place when open, by the heads of four shoulder bolts 611. In practice the one-way valve 595 and pressure operated valve 610 may be combined into a single element.

Valves 620, 622, and 623 are provided to release pressure when required from the entire hydraulic system. The valve 620 releases pressure in the sump and intake oil system; this consists of accumulator 68, oilways 593, oil cooler 621, and inlet oil assemblies 132. The valve 622 discharges pressurized oil from the operating oil manifold system 520 and 511, into the pressurized oil sump system 53. The valve 623 discharges the oil from the high pressure oil system back into the vented reservoir 514.

The system illustrated in FIG. 41 obtains high traction and comparatively low speed operation with the four hydraulic motors 400L and 400R under power, and operates at half traction with only one pair of hydraulic motors 400L or 400R under power. If dual torque hydraulic motors are employed, then all four motors may always be under power, each operating at maximum torque or half torque at any one time.

ELECTRICAL-HYDRAULIC SYSTEM

The control panel contains an ordinary starting key, and the engine can only be started if this key is inserted and turned to the 'on' position. When it is in the 'on' position: (1) a normally closed solenoid-operated fuel valve 624 opens to pass fuel; (2) a solenoid-operated lock 625 normally extended into the accelerator-operated rod 304, when the latter is in its 'stop' position, is withdrawn so that the rod can be advanced; (3) an electrical relay switch interposed between the motor of hydraulic pump 626 and pressure controlled switch 627 is closed (in the operating position), pump 626 then being automatically started by the pressure-controlled switch 627 (situated in the oil delivery manifold 511) if the pressure falls below the value required for starting the engine, and being stopped by this same switch when the pressure reaches the required value; and (4) a solenoid-operated valve 62 closes an oil pressure release passage 545 from the fuel injector 200 to the vented reservoir 514 and then opens to allow oil flow to the fuel injector from the accumulator 550.

The pump 626 feeds through a one-way valve 629 to a pressure-operated valve 630 containing a spool 631. The spool has a neck 632 which is always open to the oilway 633, and to spring chamber 634 by means of drillings 635 and (in dotted lines) 636. It also has another neck 637 open to the oilway 638, which leads into the pressurized sump manifold 639. Finally the spool contains another oilway 640 which leads to non-return valves 516L and 516R.

If oil pressure in the hydraulic system is zero throughout, then when the aforementioned key is inserted and turned to the 'on' position, the switch 627 being closed, the pump 626 will immediately start.

At this time the spool 631 is in the position shown. Oil is then free to pass through both oilways 638 and 640, but mostly through the oilway 638. Pressure rises in the oil sump system 639 until the pressure is sufficiently high to move the spool 631 over to the right against spring 641. The oilway 638 is thus closed, so that all the oil flows into oil pipes 515L and 515R. Oil then flows into the pump chambers 112 (FIG. 1) past the delivery valves 134 and into the oil delivery passages 520 and 511 (FIG. 41). The pressure continues to rise until it reaches the set value in the manifold 511, after which the switch 627 cuts out and the pump 626 stops.

OPERATION — STARTING THE ENGINE

Normally when the engine is not running, the engine pistons are back a little further than the position shown in FIG. 1 and the plungers 170 are inserted further into the grooves 169. However, when the engine is first assembled the engine pistons might not be in the correct starting position. In order to bring the engine pistons to their starting position, the air compression spaces 117 are connected to a vacuum pump. This may be done through the valve 184 in FIG. 15. The discharge valves 620, 622, and 623 are all opened, the air inlet entrance 531 being blanked off; the vacuum pump is started, a cover, 151, or the fuel injector, being removed.

The pistons move as soon as the vacuum is strong enough to overcome the friction due to ring pressure and the piston weight. The vacuum pump is then disconnected, the valves 620, 622, and 623 closed, and the inlet air entrance 531 is opened up.

After this the starting key is inserted and turned in order to pressurize the system in the manner already described. The pistons would actually be a little further back then they should be, with the plungers 170 pressing against them, but when the pressure starts to rise in the pumping sections of the power unit the engine pistons move until the plungers 170 engage in the grooves 169.

The fuel injector should have been bench tested and left full of oil and fuel. The one-way valve 254 prevents loss of this oil. The one-way valve 235 which screws into the fuel inlet of the fuel injector prevents escape of the fuel.

The accelerator pedal of the vehicle actuates the operating rod 304. The spring-loaded bolts 310 and 311 make it impossible to advance the rod 304 until the pressure in the accumulator 550 and constant displacement accumulators 108 is sufficiently high as to ensure a good start. Once a sufficient pressure is reached the rod 304 withdraws the bolts 310 and 311. At this stage, when the rod 304 is pressed in a forward direction, it first of all encounters the resistance of the detent 312. When enough force has been build up to depress the detent, the slide 306 traverses rapidly, depressing the spool valve 308 in the process. This removes the pressure from the ram 328 and allows the spool valve 309 to move into the position shown. The oil behind the plungers 170 is then able to leave via the outlets 316 and 317 and return to the vented reservoir 514, of FIG. 41, so that the engine pistons 104L and 104R can push the locking bolts 170 back. The engine pistons then accelerate rapidly towards one another under pressure from the accumulators 108. At about maximum compression, fuel is injected into the engine cylinder.

While the engine is standing idle, some loss of fuel will occur from the spaces included and adjacent to 296 (FIG. 18), which lie above the delivery valve 204 enclosed by adaptor 207. This will be particularly so if the engine is hot and fuel with a low boiling point is being used. As this might lead to an insufficiency of fuel for re-starting, means are employed to refill the nozzle automatically immediately before the first injection is made. These means are shown in FIG. 27 and will now be described.

Fuel destined for the fuel injector first enters the hose fitting 350 to flow through the one-way valve 351 and into cylinder 349, from here it flows through an adaptor (not shown) in hole 352 (FIG. 29) which is machined directly into the cylinder 349. From the hole 352 it is conveyed to the fuel inlet hole 231 via the one-way valve adaptor 232 (FIG. 26).

A free piston 353 is acted on by the main delivery oil pressure from manifold 520 via the oil entrance 315, and oppositely by the ram 354, which is urged forward when the engine is at rest by oil led from the high pressure oil supply 318. The dimensions are such that the force exerted by oil pressure from the oil entrance 315 against the area of piston 353, is less than the force exerted by oil pressure from the supply 318 acting against the end area of the ram 354. When, therefore, the spool valve 308 is in the position shown in FIG. 27, the passage 355 is under high pressure and the ram 354 and piston 353 are also in the position shown. The space 349 is, of course, always full of fuel.

When the spool valve 308 is pushed forward by the slide 306, in order to start the engine, high pressure oil is cut off from passage 355. This high pressure oil passes out through the space 346 and passages 327, and is returned to the pressurized tank via passage 358 and oil outlet 313.

As soon as the oil pressure in passage 355 falls, oil pressure from the oil entrance 315 urges the piston 353 forward so that the desired quantity of fuel contained in space 349, which is unable to return through one-way valve 351, is forced out through a pipe leading from the exit hole 352 to nozzle 232 (FIG. 26). This oil is forced on into the space 212 (FIG. 18) above the trunk extension 211, and past the delivery valve 204, to refill the spaces enclosed by adaptor 207, in advance of the actual injection stroke. A small quantity of fuel inevitably passes through the nozzle into the engine cylinder at this time, and is wasted. This however will not hurt the engine, and it will take about fifteen thousand such starts to consume a gallon of fuel. The volume of fuel injected will be proportional to the distance between ram 354 and the inner end 360 of screw 359.

These events take place well before the main engine pistons 104L and 104R are released, because pressure in the space 346 will not fall sufficiently to allow the high-pressure reservoir pressure, acting on the spool valve 309, to overcome the force exerted on ram 328, until the piston 353 has completed its stroke, and also because the effective ratio of force to mass, acting on the spool valve 309, is considerably less than the corresponding figure for the piston 353; the distance that must be traversed by the spool valve 308 before any action takes place is therefore considerably greater than is the case with the piston 353.

RUNNING THE POWER UNIT

Until the tip of the operating rod 304 touches the transmission rod 305, the quantity of fuel injected into the cylinder in each cycle is sufficient to keep the engine running, but is not sufficient to close the valve 610. When, however, the operating rod 304 is advanced sufficiently to move the transmission rod, this action increases the fuel injected into the cylinder so that pressure and flow increase sufficiently in the manifold 569 to close the bypass valve 610, and thus make oil available for traction.

OPERATION — STOPPING THE ENGINE

The engine may be stopped simply by removing all pressure from the operating rod 304. A spring (not shown) then pulls it down. When this takes place, the reversed L surface on the rod 304 catches the projection on the slide 306 and pulls the latter up. This releases the spool valve 308, which is then pushed down by pressure from the pressurized oil sump, 68 (supplemented if necessary by a spring) and high pressure oil from the outlet 318 acts upon ram 328 which then forces the spool valve 309 in an upward direction. The spool valve 309 however is not able to move until the average pressure in the oil pipe 515 falls to the value that appertains when the engine is idling. Until this low value is reached, the spool valve 356 of device 57 (FIG. 41) remains up. The pressures acting in oilway 340, oil entrance 314, and against bolt 329 (FIG. 27) therefore remain steady and too high to allow the ram 328 to force it out of the groove 332.

When the average pressure in the pipe 515 falls to the correct value, however, the spool valve 356 descends to the position shown in FIG. 41 and is therefore open to the pulsating oil pressure that is transmitted through pipes 515 and 551 from the pump chambers 112 (FIG. 1).

Pressure in the pump chambers 112 falls to zero momentarily during the compression stroke of the engine pistons, when re-compression accumulator pistons 123 are brought to rest at the end of their stroke. This pressure drop is transmitted through the large area passages of the tubes 515 and 551, valve 57 and tube 363, to piston 330 of FIG. 27. The pressure already being exerted on the ram 328 is then able to force the spool valve 309 up, while displacing the bolt 329 from the groove 332. Pressure on the piston 330 is soon re-asserted, but by this time the bolt 329 is out of the groove; and the design is such that the force of the bolt is neither sufficient to prevent the piston 309 from moving, nor to damage the sliding surfaces. Once released from the bolt 329, the piston 309 moves out under the force exerted by the ram 328 (minus the various frictional losses), with its speed controlled by the orifice 331.

By correct apportioning of the relevant dimensions these means make it possible to advance the plungers 170 (FIG. 1), at about the same time that the grooves 169 in the engine pistons are ready to receive them, near the end of the expansion stroke. An orifice 167 limits the entry speed of the plungers 170 to such a value that they do not significantly affect the speed of the engine pistons as they slide down the edges of the grooves 169. The design is such as to bypass the orifice 167 when the plungers 170 release the engine pistons.

Under some conditions it may be preferable not to employ a gas-turbine to run the compressor which boosts the inlet air pressure to the engine, but to do it by other means. For example, one may use the pressurized liquid output of the engine to power a compressor. In this case the exhaust intake tube 158 (FIG. 1) may be used to operate a hydraulic valve instead of the spool valve 160; this valve would then open or close a supply of oil from any suitable part of the hydraulic system as required.

All the features described in the foregoing specification would not necessarily be simultaneously employed. For example: the four drive motors could be replaced by a single hydraulic motor delivering power to the differential gear of a present-day automobile, and the brake system described could be modified or omitted. Furthermore, although a particular application of the invention has been described, it is to be understood that power units in accordance with the invention have numerous applications. In general, a power unit in accordance with the invention is used to provide a supply of pressurized hydraulic fluid for driving hydraulic machinery; such a unit may be used, for example, to drive a ship's propellor, an electric generator, a hoist, or a large extrusion press.

What I claim as my invention is:

1. A hydraulic power transmission system comprising:

first and second drive units each including one or more hydraulic motors;
conduit means connected to the motors for supplying working fluid thereto,
said conduit means further including a common return pipe connected to the motors for returning fluid therefrom;
a two-position valve in circuit with the motors of one said drive unit,
the motors of the other drive unit being supplied independently of said two-position valve,
said valve having a first operative position for blocking flow of working fluid to said one drive unit and a second operative position for permitting flow of working fluid to said one drive unit,
said valve being operable between its first and second positions for selective operation of one or both drive units;
a spring-loaded valve in circuit with the return pipe, the spring-loaded valve being displaceable from an open to a closed position to restrict fluid flow along the return pipe and so effect braking of the motors;
and a pressure-responsive valve means responsive to pressure in the return pipe for effecting displacement of the two-position valve to the second operative position when said pressure exceeds a predetermined value.

2. A hydraulic power transmission system according to claim 1, wherein the two-position valve is a spool valve springbiassed towards its first position, the spool valve being displaceable to its second position by a hydraulic ram operating in a chamber to which pressurized fluid is supplied, the system further including selector means for selectively controlling the supply of the pressurized fluid to said chamber.

3. A hydraulic power transmission system according to claim 2, wherein the selector means includes a solenoid-operated spool valve having an inoperative position for blocking flow of fluid to said chamber, and an operative position for admitting pressurized fluid to said chamber whereby to displace the two-position valve from its first position to its second position.

4. A hydraulic power transmission system according to claim 3, wherein the solenoid-operated spool valve is connected to a further spool valve by a lost-motion connection, the further spool valve being responsive to flow of working fluid and operable to hold the solenoid-operated spool valve in its inoperative position when the velocity of flow of working fluid exceeds a predetermined value.

5. A hydraulic power transmission system according to claim 2, said selector means including an automatic spring-loaded valve having a closed position for blocking flow of fluid to said chamber and an open position for admitting pressurized fluid to said chamber whereby to displace the two-position valve from its first position to its second position, the automatic valve being responsive to pressure of working fluid and being displaceable to its open position in response to the working fluid pressure exceeding a predetermined value.

6. A hydraulic power transmission system according to claim 1, including a pressure control valve positioned in said conduit means for maintaining the pressure of working fluid, and a pressure-responsive valve operatively connected to said pressure control valve and operable in response to pressure of working fluid in the return pipe for rendering the pressure control valve inoperative during braking.

7. A hydraulic power transmission system according to claim 1, wherein said conduit means includes a reversing valve for reversing the flow of working fluid through said motors, a mechanical interlock between the reversing valve and said spring-loaded valve to prevent actuation of the reversing valve save when the spring-loaded valve is fully closed, and means responsive to working fluid pressure in the return pipe to prevent full closing of the spring-loaded valve when said working fluid pressure is greater than a predetermined value.

8. A hydraulic power transmission system according to claim 1, including means responsive to fluid pressure in the return pipe for maintaining the two-position valve in its second position when the fluid flow through the motors is reversed.

* * * * *